(12) United States Patent
Kessler et al.

(10) Patent No.: US 11,773,523 B2
(45) Date of Patent: Oct. 3, 2023

(54) DETECTING AN IMPURITY AND/OR A PROPERTY OF AT LEAST ONE PART OF A TEXTILE

(71) Applicant: Henkel AG & Co. KGaA, Duesseldorf (DE)

(72) Inventors: Arnd Kessler, Monheim am Rhein (DE); Lars Zuechner, Langenfeld (DE); Peter Schmiedel, Duesseldorf (DE); Christina Roeleke, Moenchengladbach (DE)

(73) Assignee: HENKEL AG & CO. KGAA, Duesseldorf, NY (US)

( * ) Notice: Subject to any disclaimer, the term of this patent is extended or adjusted under 35 U.S.C. 154(b) by 776 days.

(21) Appl. No.: 16/621,613

(22) PCT Filed: Jun. 5, 2018

(86) PCT No.: PCT/EP2018/064719
§ 371 (c)(1),
(2) Date: Dec. 11, 2019

(87) PCT Pub. No.: WO2018/228860
PCT Pub. Date: Dec. 20, 2018

(65) Prior Publication Data
US 2020/0116627 A1    Apr. 16, 2020

(30) Foreign Application Priority Data
Jun. 12, 2017    (DE) .................. 10 2017 209 857.0

(51) Int. Cl.
*D06F 34/18*    (2020.01)
*D06F 103/02*    (2020.01)
(Continued)

(52) U.S. Cl.
CPC .............. *D06F 34/18* (2020.02); *G01J 3/027* (2013.01); *G01J 3/0264* (2013.01);
(Continued)

(58) Field of Classification Search
CPC .. D06F 34/18; D06F 2103/02; D06F 2103/06; D06F 2105/10; D06F 2105/42
See application file for complete search history.

(56) References Cited

U.S. PATENT DOCUMENTS 5,241,845 A * 9/1993 Ishibashi .............. G05B 19/042
68/12.02
10,175,110 B2    1/2019 Kim
(Continued)

FOREIGN PATENT DOCUMENTS

CN        102720034 B    10/2012
DE    102013210996 A1    12/2014
(Continued)

OTHER PUBLICATIONS

Machine translation of WO-2018011173-A1. (Year: 2018).*
(Continued)

*Primary Examiner* — Joseph L. Perrin
(74) *Attorney, Agent, or Firm* — Lorenz & Kopf, LLP

(57) ABSTRACT

In particular, a method performed by one or more devices is disclosed, the method comprising: obtaining an intensity information item representative of a spectral image resulting from a soiling of a textile and/or from at least one part of a textile; determining at least one output variable dependent on the soiling of the textile and/or at least one property of the textile from the intensity information item, wherein the output variable is determined by employing an adaptive evaluation algorithm, in particular an artificial neural network, wherein parameters of the adaptive evaluation algorithm are calibrated based on a plurality of training cases;

(Continued)

outputting or triggering outputting of the at least one output variable. Furthermore, a device and a system for performing the subject method is disclosed.

20 Claims, 5 Drawing Sheets

(51) Int. Cl.
| | | |
|---|---|---|
| D06F 103/06 | (2020.01) | |
| D06F 105/10 | (2020.01) | |
| D06F 105/42 | (2020.01) | |
| G01J 3/02 | (2006.01) | |
| G01J 3/28 | (2006.01) | |
| G01J 3/42 | (2006.01) | |
| G01N 21/25 | (2006.01) | |
| G01N 21/27 | (2006.01) | |
| G06Q 10/0631 | (2023.01) | |
| D06F 105/58 | (2020.01) | |

(52) U.S. Cl.
CPC ............. *G01J 3/2823* (2013.01); *G01J 3/42* (2013.01); *G01N 21/255* (2013.01); *G01N 21/274* (2013.01); *G06Q 10/06316* (2013.01); *D06F 2103/02* (2020.02); *D06F 2103/06* (2020.02); *D06F 2105/10* (2020.02); *D06F 2105/42* (2020.02); *D06F 2105/58* (2020.02); *G01J 2003/2826* (2013.01); *G01J 2003/425* (2013.01)

(56) References Cited

U.S. PATENT DOCUMENTS

| | | | |
|---|---|---|---|
| 2003/0019253 A1 | 1/2003 | Lorenz et al. | |
| 2003/0106164 A1* | 6/2003 | Metzger-Groom | A47L 15/4297 8/158 |
| 2004/0119972 A1 | 6/2004 | Smit-Kingma et al. | |
| 2010/0328450 A1 | 12/2010 | Wagner | |
| 2013/0308045 A1 | 11/2013 | Rhoads et al. | |
| 2016/0224860 A1 | 8/2016 | Koven et al. | |
| 2016/0275775 A1* | 9/2016 | Glasgow | G06K 7/10366 |
| 2016/0349189 A1 | 12/2016 | Heinz et al. | |

FOREIGN PATENT DOCUMENTS

| | | | |
|---|---|---|---|
| EP | 1242665 B1 | 9/2002 | |
| EP | 2405258 A2 | 1/2012 | |
| EP | 3101167 A2 | 12/2016 | |
| KR | 20080099099 A | 11/2008 | |
| WO | 2004053220 A1 | 6/2004 | |
| WO | 2004055256 A1 | 7/2004 | |
| WO | 2016200067 A1 | 12/2016 | |
| WO | 2017032718 A1 | 3/2017 | |
| WO | WO-2018011173 A1 * | 1/2018 | ............. D06F 33/00 |

OTHER PUBLICATIONS

EPO, International Search Report issued in International Application No. PCT/EP2018/064719, dated Jul. 25, 2018.
Da-Wen Sun: "Computer Vision Technology in the Food and Beverage Industries", 2012, Woodhead Publishing Series in Food Science, Technology and Nutrition: No. 23, XP855498652, p. 49-51, p. 1-13.
Wikipedia Internet Article: "Computer vision", May 2017, XP055490254, retrieved from the Internet: URL: https://en.wikipedia.org/w/index.php?title=Computer_vision&oldid=780534539, retrieved on Jul. 4, 2018; p. 1-10.
Anonymous, "See more than just stains", Jul. 2013, XP055490346, retrieved from the Internet: URL: https://www.rw-textilservice.de/mehr-als-nur-flecken-erkennen/150/8660/225448, retrieved on Jul. 5, 2018, 2 pages.
Anonymous, "The art of removing stains", Jun. 2007, XP055490208, retrieved from the Internet: URL: https://www.r-textilservice.de/die-kunst-flecken-zu-entfemen/150/8657/232402, retrieved on Jul. 4, 2018, 6 pages.
Anonymous, "How do I become a textile cleaner?", Nov. 2010, XP05549035, retrieved from the Internet: URL: https://www.sz-online.de/nachrichten/wie-werde-ich-textilreiniger-320254.html?bPrint=true, retrieved on Jul. 5, 2018, 1 page.
Anonymous, "Samsung Crystal Blue Washing machine in the test", Internet Article, 25, Apr. 2014, XP855498239, retrieved from the Internet: URL: https://etm-testmagazin.de/tests/samsung-crystal-blue-ww12h8488ew-eg-waschmaschine-im-test-1388, retrieved on Jul. 4, 2018, whole document.
Bennett et al: "The Essential Cosmic Perspective", Fifth Addition, Oct. 2009, XP855498669, p. 224-234.
Wikipedia Internet Article: "Retina", May 2017, XP855498786, retrieved from the Internet: URL:https://de.wikipedia.org/w/index.php?title=Netzhaut&oldid=165332485, retrieved on Jul. 6, 2018, p. 4-6.
Wikipedia Internet Article: "Color calibration", Jun. 2017, XP855498792, retrieved from the Internet: URL: https://en.wikipedia.org/w/index.php?title=Color calibration&oldid=783457369 retrieved on Jul. 6, 2018, p. 3.
Schuler et al.: "Preliminary Observations on the Ability of Hyperspectral Imaging to Provide Detection and Visualization of Bloodstain Patterns on Black Fabrics", Nov. 2012, in: Journal of the Forensic Sciences, vol. 57, No. 6, p. 1562-1569.
Van Dalen et al.: "Colour analysis of inhomogeneous stains on textile using flatbed scanning and image analysis", Jun. 2008, in: CGIV 2008 and MCS'08 Final Program and Proceedings, p. 53-57.

\* cited by examiner

DETECTING AN IMPURITY AND/OR A PROPERTY OF AT LEAST ONE PART OF A TEXTILE

CROSS-REFERENCE TO RELATED APPLICATION

This application is a U.S. National-Stage entry under 35 U.S.C. § 371 based on International Application No. PCT/EP2018/064719, filed Jun. 5, 2018, which was published under PCT Article 21(2) and which claims priority to German Application No. 10 2017 209 857.0, filed Jun. 12, 2017, which are all hereby incorporated in their entirety by reference.

TECHNICAL FIELD

The present disclosure relates to methods and devices with which at least one output variable is determined via a spectral image resulting from a soiling on a textile and/or at least one part of a textile, in particular at least one treatment parameter for a treatment of the textile.

BACKGROUND

Soilings on a textile such as garments, curtains or bedding are often difficult to identify. Soilings can not only affect the aesthetics of the textiles, but also represent a hygienic problem for the user of the textile.

Although many soilings are easy to detect by eye, it is often unclear to the user of the textile what the composition or origin of the soiling is. For example, in some cases, the user is unaware that the fabric is soiled by an accident. The soiling then appears to the user only at a later time, wherein the cause and the composition of the soiling are unknown to the user. Soilings having different compositions can also have a very similar appearance to the eye, for example, blood stains and tomato stains, in particular after a certain period of time, can no longer be distinguished by the eye.

Certain soilings are sometimes difficult to identify even with technical aids. In this case, a solution to obtain an indication of the soiling should be suitable for use in the household.

The success of a cleaning process with which the soiling is to be removed is decided not only by the soiling itself but also by the textile. A certain soiling on a certain textile (for example, dependent on the color of the textile) must be treated differently in the context of a cleaning process, then the same soiling on another textile which has a different color. For a user, it would be desirable to obtain an indication of the composition of the soiling and/or textile to enable optimal treatment of the textile.

BRIEF SUMMARY

This disclosure provides a method performed by one or more devices, comprising:
  obtaining an intensity information item of a spectral image resulting from a soiling of a textile and/or for at least one part of a textile;
  determining at least one output variable from the intensity information item dependent on the soiling of the textile and/or on at least one property of the textile, wherein the output variable is determined by employing an adaptive evaluation algorithm, wherein parameters of the adaptive evaluation algorithm are calibrated based on a plurality of training cases;
  outputting or triggering an outputting of the at least one treatment variable.

This disclosure also provides a device which is configured as or comprises corresponding elements to perform and/or to control the aforementioned method.

This disclosure further provides a computer program comprising program instructions that cause a processor to execute and/or control the aforementioned method when the computer program is run on the processor.

BRIEF DESCRIPTION OF THE DRAWINGS

The present disclosure will hereinafter be described in conjunction with the following drawing figures, wherein like numerals denote like elements, and.

DETAILED DESCRIPTION

Figure 1:
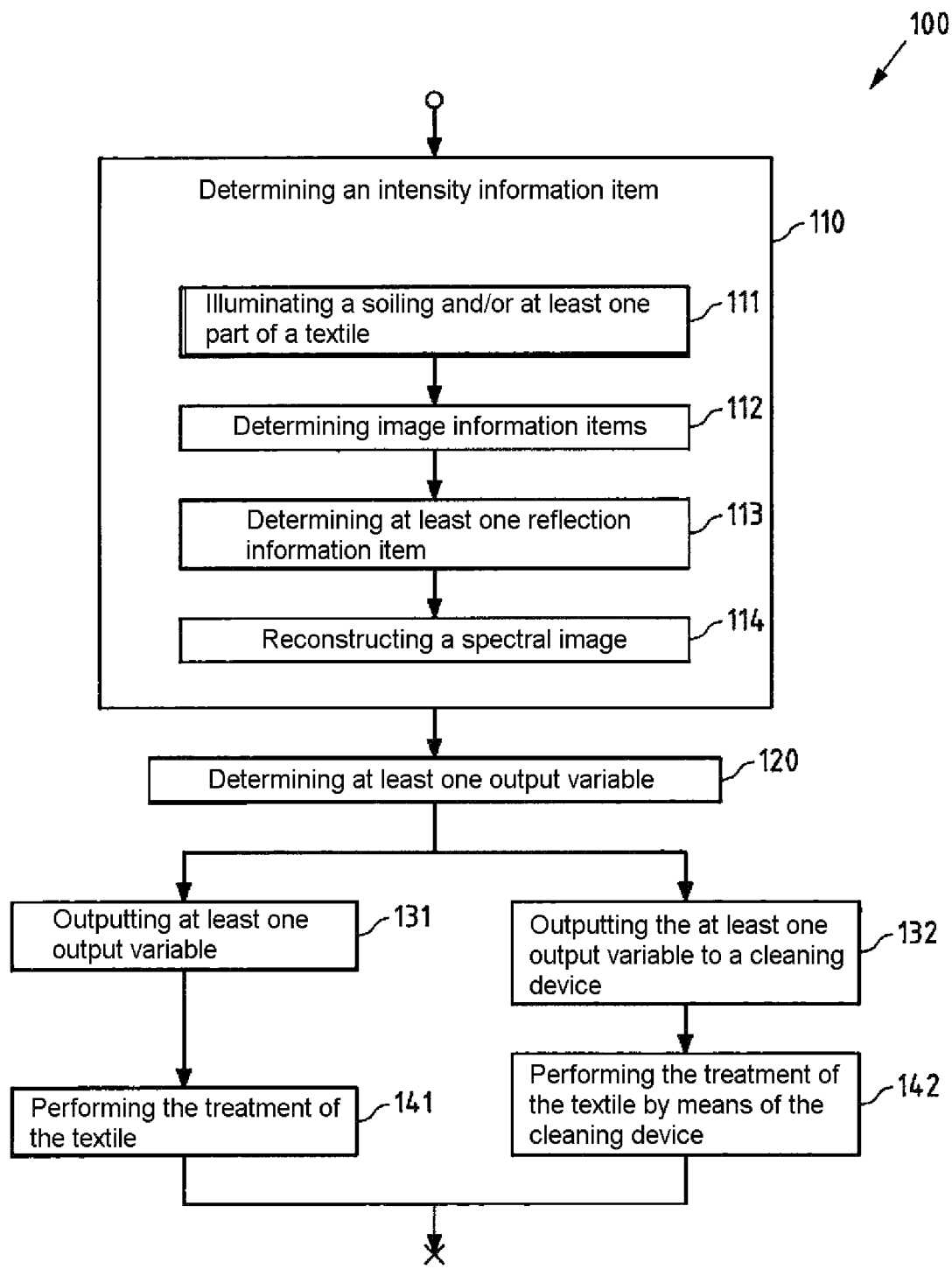
FIG. 1 is a flow chart of an embodiment according to a method of the first aspect.

The following detailed description is merely exemplary in nature and is not intended to limit the disclosure or the application and uses of the subject matter as described herein. Furthermore, there is no intention to be bound by any theory presented in the preceding background or the following detailed description.

It is therefore the object to at least partially reduce or avoid the problems described, that is, in particular to provide a cost-effective option of obtaining an indication of the composition of a soiling on a textile and/or on the textile.

This object is achieved objectively by a method having the features described herein.

According to a first aspect of the present disclosure, a method performed by one or more devices is described, the method comprising:
  obtaining an intensity information item representative of a spectral image resulting from a soiling of a textile and/or from at least one part of a textile;
  determining at least one output variable from the intensity information item dependent on the soiling of the textile and/or on at least one property of the textile, wherein the output variable is determined by employing an adaptive evaluation algorithm, in particular an artificial neural network, wherein parameters of the adaptive evaluation algorithm are calibrated based on a plurality of training cases;
  outputting or triggering an outputting of the at least one treatment variable.

According to a second aspect, a device is described which is configured as or comprises corresponding features or elements for performing and/or controlling a method according to the first aspect. Devices of the method according to the first aspect are or comprise in particular one or more devices according to the second aspect.

A spectral image results from the soiling and/or the textile through reflection and emission of radiation, for example, electromagnetic radiation. The resulting spectral image, which comprises the intensity and energy distribution of the resulting radiation, is directly affected by the composition of the soiling and/or one or more properties of the fabric. The composition of the soiling of the textile can be understood as meaning the chemical composition and thus the type of soiling, the degree of soiling and/or the spatial distribution of the soiling, for example, the form of the soiling. The one or more properties of the textile, to be equated in the description with the term "at least one property of the textile", are also decided via the resulting spectral image. A property of the textile is understood, for example, as meaning the type of materials in the textile, the color, the structure of the textile, the composition of the materials of the textile, and/or the shape of the fabric of the textile.

For example, the soiling and/or at least one part of the textile are first excited with radiation, for example, light, to detect the reflection and emission. Neither the soiling nor the textile is irreversibly affected in this case.

A soiling is understood as meaning in particular an accumulation of foreign matter on a material of a textile or a discoloration of the surface of the textile, in particular in the form of a stain, dirt or imperfections. For example, particles such as dust, traces of liquids, dyes or greasy residues are located on the surface. Furthermore, unfixed textile dyes can also have been incorporated in the material of the textile, wherein the unfixed textile dyes are able to dissolve from the material, for example, in a cleaning process such as washing. A soiling can also be understood as meaning such dissolved textile constituents as textile dyes.

In particular, garments, curtains or bedding are understood to be textiles. Garments and bedding comprise, for example, shirts, T-shirts, dresses, jackets, sweaters, pants, blankets, slips, and covers. The textiles can comprise various materials, for example, natural fibers, chemical fibers or other materials such as leather.

A material type, as a possible property of the textile, can be, for example, the yarn of the textiles. Occasionally, for example, a textile which includes yarn as a material, is finished. In this case, a chemical modification of the yarn takes place, for example, to make the textile more sturdy or the like. Such finished materials of textiles are also referred to as treated fibers, and can be comprised as material from the textile. An example of such a treated fiber is, for example, GORETEX.

In one embodiment of the method according to the first aspect, the material structure, the material type, the material distribution, the material wear of the at least one part of the textile or a combination thereof can be detected, for example, for detecting at least one part of the textile.

The material structure of the at least one part of the textile is understood in particular as meaning the type and/or shape of a woven textile, a knit textile or nonwoven textile or batt. In this case, the intensity information item can in particular be characteristic of the type of interweaving of fibers, as produced, for example, via weaving, knitting, or characteristic of a nonwoven textile. In this case, a splice pattern and a thread cross-over pattern and a thread weave can be represented by the intensity information item. Yarn density, fiber thickness, fiber length, fiber fineness and/or fiber orientation can be detected in particular in the intensity information item. The material structure of the at least one part of the textile has a direct effect on the requirements for the treatment of the textile, for example, a nonwoven fabric can have different cleaning treatment requirements than a knitted or woven structure.

The material type is understood in particular as meaning the composition of at least part of the material of the textile. For example, the intensity information item is indicative of natural fibers, chemical fibers or natural materials such as wool or leather in the textile, and those fibers or materials having a treatment. The treatment can be, for example, a coating of the fibers, a textile finishing and ironing strength and/or for soil release polymers on the textile. The material type also has a significant effect on an optimal treatment of the textile, such as a cleaning treatment. The term material type comprises the color of the textile.

Using the material distribution of the textile, it can be detected, for example, whether the textile has a mixed fabric of different fiber types or fiber materials and/or whether partial regions of the textile are made of a different material. In this case, the ratio of the different materials to each other, for example, a density ratio, mass ratio or area ratio, can be detected. Further represented by the intensity information item can be the type and number of connection points, for example, seams, welds or adhesive points.

Using the intensity information item representative of the material wear, it can be recorded in particular whether there are pillings, cracks, holes, wear or other structural damage to the textile. In particular, for pillings, which arise by loosening fibers from the textile composite and occur in the form of knots on the textile surface, the type, shape, size or height, number and/or distribution of the material wear can be detected.

In a further embodiment of the method according to the first aspect, the intensity information item can be representative, for example, of the presence and/or type of closure element, of coating material and/or of applications in, at and/or on the at least one part of the textile.

Closure elements on the textile are understood in particular as meaning zippers, hook-and-loop fasteners, buttons or similar arrangements, which are in particular configured to create a connection of parts of the textile via a positive connection and which can be designed detachable.

The at least one part of the textile can have one or more coating materials, in particular the fibers are coated or a coating is applied to the structure of the material of the textile, for example, on the fabric. The coating can be, for example, a functional layer such as a protective layer, sealing layer, or finishing layer of the textile or altering the look or feel of the textile. In particular, the protective layer or the sealing can be arranged as an additional layer on the finishing layer of the textile.

Textiles, in particular garments, can further have applications such as imprints, sequins, lace, patches or the like, which can also be represented by the intensity information item. Likewise, functional textiles can have functional elements as applications or electronic elements can be arranged in the textile or on the surface of the textile.

If at least one part of the intensity information item represents such closure elements, coatings and/or applications on the textile, care can also be taken to protect the corresponding elements during treatment. On the one hand, a wear of such closure elements, coatings and/or applications can be reduced during a treatment and on the other hand, for example, a detachment of coatings or applications can be avoided.

For example, at least one of the aforementioned properties of a textile can be detected in the resulting spectral image.

The intensity information item obtained according to the first aspect is representative of a spectral image resulting from a soiling of a textile and/or of resulting from at least one part of the textile. In this case, the obtained intensity information item need only be representative of at least part of the spectral image. In particular, the intensity information item contains at least one value representative of the intensity of the spectral image within an energy range. For example, a monochrome or intensity integrated over an energy range can be detected using a value representative of the intensity of the spectral image within an energy range, A spectral intensity distribution with energy resolution can be obtained using a plurality of values, each representative of the intensity in different energy ranges. Such an intensity information item is accessible to a physical measurement.

Since the composition of the soiling and/or the one or more properties of the textile affects the resulting spectral image, the intensity information item obtained is also co-determined by the composition of the soiling and/or the one or more textile properties. Thus, an output variable can be determined from the intensity information item which depends on the composition of the soiling and/or on one or more textile properties.

In particular, the at least one output variable can be one or more values representative of the chemical composition of the soiling, the degree of soiling, the spatial distribution of the soiling and/or the structure of a textile. For example, the at least one output variable comprises at least one value for the occurrence and/or the concentration of a chemical element or a chemical compound, the amount of the soiling, the areal extent of the soiling and/or properties with respect to the textile. The at least one output variable can also be determined by a classification of the intensity information item.

By outputting or triggering the outputting of the at least one output variable, it is thus possible to provide the user an information item about the composition of the soiling of the textile and/or an information item on one or more textile properties which are advantageously used to identify the soiling and/or properties with respect to the textiles. For example, information items about the chemical composition or about the occurrence of individual elements or compounds can be made available to the user. In particular, a further information item can be provided by classification using the at least one output, for example, whether the soiling contains levels of certain organic or inorganic components, such as dyes or lipids, and, optionally, the origin of the soiling. In particular, in combination with properties relating to the textile, for example, the at least one output variable can give the user information items about a possible treatment of the textile, which treatment in particular has a high prospect of removing the soiling from the textile.

The output variable can, for example, be indicative of a specific soiling of the textile and/or a specific part of the textile.

The method according to the first aspect or the device according to the second aspect thus makes it possible, in particular, to make it easier for the user to identify the composition or the origin of the soiling and/or the textile. If, for example, a soiling and/or one or more properties of the textile are not identifiable by the eye, at least one output variable, which is dependent on the composition of the soiling and/or the textile, can be determined via the method or device. For example, the output can enable the user to distinguish between different compositions of soilings and/or textiles that provide similar visual appearances to the eye.

In an exemplary embodiment, the method step of obtaining the intensity information item comprises the following steps:
(i) illuminating the soiling of the textile and/or the at least one part of the textile with light comprising at least one broadband wavelength range;
(ii) detecting image information items of the illuminated soiling of the textile and/or the at least one part of the textile;
(iii) determining at least a reflection information item indicative of the reflected light from the wavelength channels of the image information items corresponding to the at least one broadband wavelength;
(iv) reconstructing a spectral image, wherein an evaluation of the at least one reflection information item takes place.

By illuminating the soiling of the textile and/or the at least one part of the textile, a defined excitation can be based on obtaining the intensity information. For example, the soiling and/or the textile is exposed to or illuminated by radiation via a light source, wherein the radiation used has a certain intensity and/or certain spectral distribution. Such illumination of at least one part of the soiling and/or at least one part of the textile ensures achievement of sufficient illumination, irrespective of the external conditions. Obtaining the intensity information item can thereby be made possible also in poor external conditions, such as low daylight in a dark room, or at least the quality of detection can be improved.

An illumination is understood as meaning that light is generated with the aid of an artificial light source, so that in particular a (better) visualization of the soiling of the textile and/or the textile can take place. The illumination is effected in particular by radiation which lies at least partially in the visible range of the electromagnetic spectrum, for example, with a radiation whose wavelength covers at least one part of the wavelength range from about 380 nm to about 780 nm. In particular, the illumination with light comprises at least one of the wavelength ranges for the visible regions of red, green, blue light, or a combination thereof.

For example, LEDs (light emitting diode) are used for illumination. LEDs can cover a well-defined frequency range. LEDs having different color temperatures can be used individually or in combination, for example, with red, green, blue and/or white LEDs. Alternatively or additionally, a display of an electronic device can be used for illumination. For example, the display of the electronic device at least partially, in particular over the entire display surface, can emit light in a broadband wavelength range, for example, in red, green, blue light, or a combination thereof.

The duration of the excitation can be varied. In particular, the time duration can be relatively short, that is, below one second using, for example, a flash. The duration of the excitation can be further less than about 0.1 seconds, in particular less than about 0.01 seconds. A short excitation or a flash can be used alone or combined with another illumination element. For example, a flash is used in combination with a continuously operating illumination element, wherein flash and illumination elements are combined in a combined illumination unit. It is also possible to temporally modulate the light intensity.

Illumination elements and optical sensor (also referred to as an optical sensor element) can also at least partially use the same elements, which enables significant cost advantages in the manufacture of the device, in particular when using LEDs. When illumination elements and optical sensor are given at least partially identical elements, a coordination of excitation and detection at certain wavelength ranges is also facilitated. For example, LEDs can both emit and detect light. The soiling can be placed between an illumination element comprising at least one transmitter LED and an optical sensor comprising at least one receiver LED. If transmitter LED and receiver LED are identical, transmission or attenuation of the radiation by the soiling can be determined in a particularly simple and direct manner. Likewise, an arrangement of transmitter LED and receiver LED can be provided in a reflection or emission measurement.

A detection of image information items of the illuminated soiling of the textile and/or the at least one part of the textile is performed, for example, by employing the optical sensor.

In order to obtain a spectral image, at least one reflection information item is indicative of the reflected light from the wavelength channels of the (detected) image information items corresponding to the at least one broadband wavelength. A reconstruction of a spectral image takes place from these detected image information items, wherein an evaluation of the at least one reflection information item takes place. If the soiling of the textile and/or the at least one part of the textile is illuminated with light comprising a broadband wavelength range, a spectral image can be reconstructed correspondingly for this wavelength range. If the soiling of the textile and/or the at least one part of the textile is illuminated several times with light comprising a different wavelength range, a plurality of image information items (for example, image information items for each illumination and detection of image information items) can be obtained, for example. This plurality of image information items can be evaluated accordingly, so that a spectral image can be reconstructed.

In an exemplary embodiment, the illumination of the soiling of the textile and/or of the at least one part of the textile takes place with one of the following broadband wavelength ranges:
(i) about 600 nm to about 780 nm; (corresponds to broadband red)
(ii) about 490 nm to about 600 nm; (corresponds to broadband green)
(iii) about 380 nm to about 490 nm; (corresponds to broadband blue)
(iv) or a combination thereof.

A wavelength range of about 600 nm to about 780 nm corresponds to a broadband illumination in the color red. A wavelength range of about 490 nm to about 600 nm corresponds to a broadband illumination in the color green. A wavelength range of about 380 nm to about 490 nm corresponds to a broadband illumination in the color blue Combined illumination with light comprising a plurality of the specified ranges comprises, for example, sequential illumination with one of the wavelength ranges, in particular within such a short time interval that the sequential illumination is perceptible by a user as a process.

The wavelength range can be further adapted specifically to the determination of the intensity information item. For example, an optical sensor comprising a CMOS element having a sensitivity maximum in the near infrared region (NIR) is used. In this case, an illumination with radiation in the NIR range is advantageous. The NIR range is understood as meaning a wavelength range of the electromagnetic spectrum of at least about 780 nm, in particular up to a maximum of about 3000 nm, in particular of at least about 780 nm to a maximum of about 1400 nm (or example, the so-called IR-A wavelength range of the light), and/or of at least from about 1400 to about 3000 nm (for example, the so-called IR-B wavelength range of light).

An exemplary embodiment provides that at least one optical sensor element is used to determine the intensity information item.

In this case, an optical sensor element or an optical sensor is understood as meaning sensors which can determine an intensity of incident radiation, in particular electromagnetic radiation in the visible range and optionally beyond. In particular, the optical sensor element is configured to provide an energy resolution and/or spatial resolution of the intensity information item. The optical sensor element can comprise an image sensor, in particular a digital image sensor. In particular, at least one semiconductor element, diode, CCD element, for example, a Bayer sensor, or CMOS element, for example, in sensor of the type Foveon X3, can be used to determine the incident radiation. The optical sensor element can contain optical filters and in particular a spectrometer. Also conceivable is the use of monochrome sensors without color resolution. Likewise, sensors can be used which are limited to certain wavelength ranges. For example, the optical sensor can be based on at least one photodiode and/or at least one LED element. Individual elements or arrays of elements, such as photodiodes or photosensitive components such as LEDs can be used. It can be advantageous to optimize the size of the individual sensor elements, for example, the individual photodiodes, in terms of dynamics, resolution and/or sensitivity.

In one embodiment, the optical sensor element provides a three-dimensional spatial resolution. The accuracy of the structure determination of the textile and/or the determination of the soiling of the textile can be further increased using a three-dimensional spatial resolution. It is conceivable to use a plurality of images from different perspectives via the same optical sensor element or the same sensor arrangement. Likewise, optical elements formed specifically for a three-dimensional resolution, such as attachment lenses or objective lenses can be provided, or a 3D camera can be used. Additional optical elements, for example, attachment lenses or objective lenses, can also be arranged on conventional, essentially two-dimensional optical sensors, for example, digital cameras or cameras integrated into mobile devices. Already existing devices can thus be retrofitted for a three-dimensional resolution. Using the three-dimensional resolution, for example, textile structure, for example, the shape and arrangement of the fabric, the mesh or the nonwoven textile, and/or the shape and arrangement of a soiling (for example, within) the textile can be determined in more detail and thus a more comprehensive and accurate intensity information item can be obtained.

In one especially simple embodiment, the at least one optical sensor element comprises at least one camera-like element and provides an image information item. Accordingly, digital cameras or cameras integrated into electronics (for example, mobile devices) can be used for the method or serve as at least one device for performing the method. In this case, attachments for a three-dimensional spatial resolution can be used on the camera-like element.

Furthermore, a radiation source, for example, a light source such as an illumination element, a display, and/or a flash can be provided, which are in particular adapted to the optical sensor element and serve to illuminate the surface of the soiling. Such a radiation source can be combined with the optical sensor element in a structural unit. The radiation source or the illumination element for illuminating the soiling on the textile and/or the at least one part of the textile can, for example, be effected with one or more LEDs. Illuminating the soiling on the textile and/or the on least one part of the textile, in particular for illuminating using one of the following broadband wavelength ranges, can be done, for example, using an RGB LED or with one or more single-color LEDs. For example, one LED per broadband wavelength range (color), or one RGB LED can be used for each of the broadband wavelength ranges. In a preferred exemplary embodiment, the illumination element comprises a multiple number of LEDs greater than or equal to one (n≥1, where n stands for the number of LEDs). For example, the radiation source or the illumination element can emit a broadband light for a defined wavelength range, for example, light in a red, green, blue wavelength range, or a combination thereof.

The evaluation algorithm can be an artificial system (for example, a device according to the second aspect or a system according to the third aspect) that learns, for example, from training cases as examples and can generalize them after the end of the learning phase. That is, the examples are not simply learned by heart, but rather patterns and principles are recognized in the learning data. Different approaches can be followed for this purpose. For example, supervised learning, partially supervised learning, unsupervised learning, empowered learning, and/or active learning can be used. Supervised learning can be done, for example, by employing an artificial neural network (such as a recurrent neural network) or by employing a support vector machine. Unsupervised learning can also take place, for example, by employing an artificial neural network (for example, an auto-encoder). For example, the repeatedly obtained and/or determined intensity information items or the specific output variables serve as learning data.

Alternatively or additionally, it is conceivable that the obtained and/or determined intensity information items or the specific output variables are associated with further information items, for example, with the number and/or the respective age of the persons of a household for creating a personal soiling profile or for example, with the season for the creation of a seasonal soiling profile.

It is also possible to use the multiple times obtaining and/or determining the intensity information items or the output variables for a machine learning. For example, the soiling profile can be determined, at least in part, based on machine learning.

The reliability of the determination of the at least one output variable and in particular the treatment of the textile, in particular for the removal of the soiling from the textile, can be increased by these measures.

Each of the training cases can, for example, be given by an input vector, an intensity information item and an output vector of the artificial neural network. The output vector is given, for example, by substance concentrations determined by employing chemical analysis within this soiling of a textile belonging to the training case and/or a part of the structure of a textile.

Each test case can be generated, for example, by converting the soiling of a textile belonging to the training case and/or part of the structure of a textile into a predetermined state (for example, defined soiling on a defined textile) and subsequently generating an intensity information item representative of a spectral image, and at the same time performing a chemical analysis to measure the substance concentration (for example, the soiling on the textile and/or of the textile). The determined intensity information item is transmitted as an input vector, the substance concentration as an output vector of the training case.

For example, the calibration can be done by employing a neural network. In this case, for example, an error feedback in the neural network, a so-called back propagation, is done. In this case, for example, the parameters used to determine the output variables which the neural network uses are optimized. Using the optimized parameters, the neural network is suitable, for example, to meaningfully determine output vectors (output variable, in particular for determining a treatment parameter) from input vectors (intensity information items representative of a spectral image) that deviate from the originally learned input vectors of the training cases. Accordingly, for example, the parameters are adaptive, so that a calibration can be performed using the already known (for example, stored in a database) parameters.

In an exemplary embodiment, it is provided that, for example, a soiling of a textile and/or at least one part of a structure of a textile, in particular a stain and/or a textile type, is recognized by employing an image processing unit, and a plurality of input vectors is formed from those parts of the intensity information item that are associated with the soiling of the textile and/or the at least one part of the textile. In this case, for example, an input vector of the neural network can be formed from each of the image points associated with this soiling of the textile and/or with the at least one part of the textile (for example, a pixel which is comprised in the intensity information item). The components of such an input vector are given by the intensity values of the spectral image of the associated image point represented by the intensity information item. Furthermore, a chemical analysis can be performed, for example, with regard to the soiling of the textile and/or the at least one part of the textile. The associated result can, for example, form the output vector. Subsequently, for example, the neural network can combine each of the input vectors with the output vector. In this way, a plurality of training cases can be generated from the soiling of the textile and/or the at least one part of the textile (for example, a training case in particular for each detected image point of the intensity information item).

In an exemplary embodiment, at least one image point within the spectral image is used as a fixed predetermined reference image point for a spectral exposure compensation of the image, wherein image data from image points of the image that are different from the at least one reference image point are normalized using image data of the at least one reference image point.

An exemplary embodiment provides that the neural network or the evaluation unit which uses the neural network performs a spectral exposure compensation of the spectral image represented by the intensity information item. For example, an instantaneous exposure condition of the soiling of the textile and/or the at least one part of the textile can be detected (for example, measured) and compensated for by a normalization of the image points of the spectral image represented by the intensity information item almost simultaneously. The spectral composition of the information items (for example, image data) of these image points is also normalized by the spectral exposure compensation in addition to the exposure intensity of individual image points of the spectral image.

The exposure conditions are usually determined by incident sunlight and the angle of incidence of the solar radiation on the soiling of the textile and/or the at least one part of the textile.

It can be provided in the spectral exposure compensation, for example, that within the image region comprised by the intensity information item with the soiling of the textile and/or the at least one part of the textile, a body is detected whose surface has, for example, predetermined, in particular optical properties. For example, one of the properties can be a particular color or gray scale and/or brightness. For example, this body is formed flat. For example, this body is firmly connected to a treatment device, in particular a cleaning device (for example, washing machine). In the event that the image information item from which the spectral image represented by the intensity information item is reconstructed is detected by an optical element, for example, the body can always be arranged in a same position relative to the optical element so that the body is always comprised in the same image region of the detected image information items.

In an exemplary embodiment, at least one predetermined image point (also referred to as a reference image point) of the detected image information item can be used for the spectral exposure compensation. The reference image point of the detected image information item is, for example, on the body with predetermined surface properties. For example, the remaining detected image points of the image information item can be normalized based on the reference image point. To avoid unnecessary computational effort, for example, only those image points that comprise the soiling of the textile and/or the at least one part of the textile can be normalized.

In an exemplary embodiment, the spectral exposure compensation can be performed by the neural network. For example, it can be provided that a layer of the neural network performs the spectral exposure compensation. The spectral exposure compensation can also be performed, for example, at regular intervals, in particular automatically. Time-varying exposure conditions can be normalized in a timely manner ('real-time'). In the case where an optical element is used for detecting the image information items, which optical element is not fixedly arranged, as is the case for example, with an electronic device (for example, a smart phone, tablet or the like), for example, the movement of the optical sensor can change the exposure conditions of the detected image information items. Accordingly, for example, a spectral exposure compensation performed at regular time intervals can compensate for these different exposure conditions.

In an exemplary embodiment, the method according to the first aspect further comprises:

determining at least one treatment parameter of the textile based at least in part on the determined intensity information item; and outputting or triggering an outputting of the at least one treatment parameter.

The treatment parameter is, in particular, a recommendation for a specific treatment adapted to the soiling and/or to one or more properties of the textile. For example, a particularly gentle treatment of the textile can be in the foreground, so that the at least one treatment parameter ensures the highest possible longevity of the textile. Likewise, a particularly intensive treatment of the textile can be desired, wherein the at least one treatment parameter is optimized with respect to the effect of the treatment of the specific structure, for example, the effectiveness of a cleaning process. Also, a recommendation about a particularly energy-saving treatment of the at least one treatment parameter can be represented. Furthermore, the combination of soiling and textile determining the treatment parameter can be taken into account so that, for example, the soiling can be removed from the textile as efficiently as possible.

By determining at least one treatment parameter based on the intensity information item, it is possible, for example, to adapt the material wear when treating the textile according to the material wear in order to curb further increased material wear or, for example, also to remove the pillings in order to restore the appearance of the textile. The user can thus be given a recommendation about an optimum cleaning process with regard to the soiling present.

For a soiling, it is possible to draw conclusions about treatment parameters via the intensity information item dependent on the composition of the soiling. In this case, the treatment parameter can be determined indirectly from a further output variable; for example, an output variable representative of the composition of the soiling is first determined and treatment parameters are determined from this output variable representative of the composition of the soiling. The treatment parameter can also be determined directly from the intensity information item, for example, by employing a classification via stored intensity information item and via treatment parameters associated with the classes. This evaluation can be performed, for example, by employing the evaluation algorithm of an evaluation unit.

In particular, when a user of the textile can not identify the soiling with the eye and it is therefore unclear how to remove the soiling again, the method according to the first aspect or the device according to the second aspect can provide a recommendation about an optimal cleaning strategy as a treatment parameter for the treatment of a textile. For example, it can be unclear to the user whether a soiling contains lipids or certain dyes that can not be reliably removed via commonly used cleaning strategies. Additionally or alternatively, the one or more properties of the textile can also be taken into account. A recommendation can be made about a cleaning strategy adapted to the individual composition via the treatment parameters determined by the composition of the soiling and determined in the context of the method, the identification of corresponding ingredients of the soiling and/or of one or more properties of the textile. As a result, the removal of the soiling can be greatly simplified and made much more reliable.

It is also conceivable that substances dissolved from the material of the textile, for example, unfixed textile dyes, are determined as a soiling via the at least one output variable. This happens in particular during the performance of a treatment, so that the user is given a conclusion on the effectiveness of the treatment of the textile. For example, the user can recognize whether an excessive amount of textile dyes dissolves from the material of the textile, whereby the user receives an incentive to change the cleaning strategy and, if necessary, to make it gentler with regard to the textile dye. Likewise, a decolorization of a textile can be intended and a conclusion about the degree of decolorization can be drawn regarding the at least one output variable by a cleaning strategy.

In particular, the at least one treatment parameter is indicative of a cleaning agent type, an amount of cleaning agent, a cleaning temperature, a type of cleaning device, settings of a cleaning device, or combinations thereof.

Cleaning agents are used, for example, in the household for the cleaning of different objects. For example, a cleaning agent, for example, a washing agent, for washing machines is used for cleaning textiles. However, a cleaning agent should likewise also be understood as meaning cleaning auxiliaries or cleaning additives, for example, a bleaching additive, a fabric softener or laundry starch. A cleaning agent can also be a liquid, a dispersed system, for example, a gel or foam, or a solid, in particular, a tab, powder or granules.

A cleaning agent can, for example, have one or more components from the group of components comprising surfactants, alkalis, builders, grayness inhibitors, optical brighteners, enzymes, bleach, soil release polymers, fillers, plasticizers, perfumes, dyes, conditioners, acids, starch, isomalt, sugar, cellulose, cellulose derivatives, carboxymethylcellulose, polyetherimide, silicone derivatives and/or polymethylimines.

A cleaning agent can further comprise one or more other ingredients. These ingredients include, but are not limited to, the group including bleach activators, chelants, builders, electrolytes, nonaqueous solvents, pH adjusters, perfume carriers, fluorescers, hydrotropes, silicone oils, bentonites, anti redeposition agents, anti-wear agents, anti-wrinkle agents, dye transfer inhibitors, anti-microbial active substances, germicides, fungicides, antioxidants, preservatives, corrosion inhibitors, anti-static agents, bittering agents, ironing auxiliaries, repellents or impregnating agents, swelling or slipping agents and/or UV absorbers.

The treatment parameter can represent the cleaning agent type and thus be indicative of the composition of the cleaning agent. For example, if some level of dye is contained in the composition of the soiling, the use of certain bleaching additives can be recommended to the user. For example, if certain levels of lipids are present in the composition of the soiling, the use of specific surfactants and/or lipases can be included in the recommended cleaning strategy.

The treatment parameter can represent the amount of cleaning agent and, in particular, indicate an absolute amount of the cleaning agent. Likewise, a relative amount of the cleaning agent can be displayed by employing the treatment parameter, for example, based on the mass of the textiles to be cleaned or a bath ratio or an amount of cleaning agent based on a water volume to be used for cleaning. A cleaning agent type and/or an amount of cleaning agent can thus be determined which ensures an optimum removal of the soiling via the intensity information item dependent on the composition of the soiling.

An optimal temperature for removing the soiling can be indicated for the certain composition of the soiling using a treatment parameter representative of the cleaning temperature, particularly in combination with a cleaning agent type. On the one hand, the cleaning temperature can be high enough to ensure that the soiling is removed as completely as possible and, on the other hand, kept low in terms of energy consumption and protection of the textile.

A cleaning device is understood in particular as meaning a washing machine, in particular automatic household washing machine. In this case, a treatment parameter can indicate a certain type of such a cleaning device. It is also conceivable that the treatment parameter at least partially simulates cleaning strategies to be performed manually, such as a hand washing. Also, the treatment parameter can comprise settings of a cleaning device, for example, a program of an automatic household washing machine or a sequence of such programs.

As a result, the removal of the soiling can be greatly facilitated for the user using the treatment parameter. In particular, in the case of soilings which can not be identified with the eye, an optimum cleaning strategy with regard to cleaning, but also to energy consumption and the protection of the material of the textile can be recommended via the method. For example, the recommendation of the cleaning agent type and the settings of the cleaning device comprises whether the intensity information item indicates a certain content of lipids in the soiling and therefore corresponding fat-dissolving components should be included in the cleaning agent or whether certain dyes are present in the soiling, which can be specifically attacked via a specific cleaning agent type and settings of the cleaning device.

In an exemplary embodiment, the method further comprises:
performing or causing the performance of a treatment of the textile corresponding to the at least one determined treatment parameter via at least one treatment device, in particular a cleaning device.

A treatment, for example, can comprise a pretreatment of the soiling of the textile and/or the textile. For example, this can comprise a pre-cleaning, an application of pretreatment agents or a certain arrangement of the textile. For example, at least one treatment parameter indicates a pre-cleaning or pre-washing, in particular a soaking of the textile in a certain solution or a pre-cleaning program of a cleaning device. Various pretreatment agents can be provided for manual or automatic application, for example, the application of a stain remover or bleach is indicated. Furthermore, an arrangement of the textile can be given in particular in that the textile should be turned "on the left" before the actual treatment or arranged in another device, for example, in a laundry bag. Furthermore, the pretreatment can also comprise closing the closure element, for example, the user can receive an indication of closure of a zipper for subsequent treatment.

It can be provided, for example, that the textile is dyed or subjected to a gentle treatment as a treatment of the textile. In an advantageous embodiment of the method according to the first aspect, the treatment comprises a cleaning treatment, in particular a washing treatment performed on a cleaning device, for example, a washing machine.

In particular, the method further comprises performing the treatment by employing a cleaning device.

In this case, the intensity information item can be obtained before, during and/or after the treatment of the textile has been performed. Having received a pre-cleaning, for example, prior to a cleaning treatment to be performed, a recommendation about the cleaning strategy to be used can be given to the user.

When obtaining the intensity information item during the cleaning, the cleaning can be performed dynamically, for example, that is, a cleaning device can adapt to the just determined at least one output variable during the cleaning, in particular by the output variable being determined continuously. For example, during the washing program, a washing machine adjusts, for example, the temperature or the amount of cleaning agent according to the determined output variable. In particular, the intensity information item of textile components dissolved from the textile such as textile dyes can be obtained here.

By obtaining the intensity information item after a cleaning, for example, the result or the effectiveness of a treatment can be recorded and checked.

The at least one output variable can be output to the user on a display or a corresponding output can be triggered. The user can then perform the treatment of the textile. Alternatively or additionally, in one embodiment of the method, the at least one output variable can be output to a cleaning device. For example, the at least one output variable can represent at least one treatment parameter which is output to the cleaning device, so that the cleaning device, for example, adopts the corresponding treatment as default and the user merely has to start the cleaning device. It is also conceivable that the cleaning device automatically performs the treatment with the output of the at least one treatment output variable. For example, the cleaning device can have a dosing device for cleaning agent to automatically provide the cleaning agent type and amount of cleaning agent according to the recommended treatment of the textile. The user friendliness of the method is thereby improved as a result.

In one embodiment of the method, the determination of the at least one output variable comprises a comparison of the intensity information item with comparison values. Corresponding comparison values can be stored in a database. The intensity information item can be subjected to a classification, wherein the at least one output variable is obtained or affected by a result of the classification. For example, a classification can be based on a comparison of the intensity information item with a database of already known intensity information items. A corresponding classification can be done, for example, additionally or alternatively with the adaptive evaluation algorithm. In particular, a neural network as described in this specification can be used here.

The comparison values or a database provided for this purpose can in particular contain intensity information items of typical soilings occurring in the fields of application of the textiles. These can be represented, for example, by the training cases. These can then be used by the adaptive evaluation algorithm to determine an output variable, for example, from a neural network. For example, in the household sector, intensity information items of typical soilings can be accessed, such as various food residues, traces of beverages, grass or colors. The comparison values can comprise at least one value for the intensity in a certain energy range of a spectral image and/or continuous values for at least one energy interval of a spectral image. Furthermore, certain output variables can be associated with the corresponding comparison values, for example, at least one for removing the soiling.

In a further embodiment of the method, the method further comprises:

determining a soiling profile at least partially based on the output variable, in particular, based on a plurality of determined output variables, wherein the determination of the at least one output variable is based at least partially on the soiling profile.

A soiling profile can thus be created via the at least one output variable, which profile is adapted to the respective composition of the soiling. In particular, a plurality of output variables in the context of a history of determined output variables can be included in a soiling profile, so that future determinations can be based at least partially on the soiling profile. Thus, the determination of the at least one output variable can be made adaptive and more precisely adapted to the respective requirements via the soiling profile. The determination of the output variable can be performed more precisely, in particular with regard to the dependence on the chemical composition of the soiling. This can be performed, for example, by employing the adaptive evaluation algorithm, in particular by a neural network.

For example, a soiling profile can be created with respect to commonly occurring compositions of soilings. Additionally or alternatively, these can be stored for various structures of textiles. In particular, compositions of soilings can be linked to various structures of textiles. In particular, the cleaning agent type and the type of cleaning device in a soiling profile can also be taken into account for the output of at least one treatment parameter.

It is also conceivable that an information item about the effectiveness of the treatment is recorded in the soiling profile. For example, after a cleaning process, an intensity information item can again be determined in order to determine the effectiveness of the treatment. This will allow future treatments to be further optimized via the soiling profile.

Likewise, after cleaning, the user can make an assessment of the at least one output variable, for example, an evaluation of the effectiveness of the treatment, which enters into the soiling profile. Thus, a personal adaptation of the determination of the output variable, in particular the treatment, can be achieved.

In a further embodiment of the method, at least one of the devices for performing the method is a mobile device. In particular, a communication can be made via a communication system between a mobile device, for example, a smart phone, laptop, tablet, wearable or a camera, and at least one further device, for example, a cleaning device and/or an optical sensor element. According to one embodiment, the device according to the second aspect comprises a communication interface. For example, the communication interface is configured for wired or wireless communication. For example, the communication interface is a network interface. The communication interface is preferably configured to communicate with a communication system. Examples of a communication system are a local area network (LAN), a wide area network (WAN), a wireless network (for example, according to the IEEE 802.11 standard, the Bluetooth (LE) standard and/or the NFC standard), a wired network, a mobile network, a telephone network and/or the Internet. A communication system can comprise communication with an external computer, for example, via an Internet connection.

In particular, an optical sensor element for obtaining the intensity information item is provided and integrated into a mobile device. This facilitates the determination of the intensity information item for the user. It is also conceivable that an optical sensor element is provided in a cleaning device and/or a mobile device is used to display the at least one output variable.

In a further embodiment of the method, the intensity information item is representative of a hyperspectral image. An intensity information item representative of a hyperspectral image is understood in particular as meaning that the intensity information item has intensity values in a plurality of channels for different energy intervals as an intensity distribution, wherein at least two of the energy intervals adjoin or overlap each another. In particular, a hyperspectral image of a multispectral image can be delineated in that while a multispectral image also has intensity values in a plurality of channels for different energy intervals, the energy intervals are spaced apart from each other, that is, in a multispectral image, intensities are reflected by individual energies separate from each other. In contrast, in a hyperspectral image, in particular, "adjacent" intensity values are reflected by connecting or overlapping at least two of the energy intervals with each other. A hyperspectral image can thus at least partially reflect a continuous spectrum. An intensity information item representative of a hyperspectral image has, in particular, the advantage that information items which are not visible to the eye and indicative of the composition of the soiling can also be detected.

The intensity information item can in this case comprise values in at least about 20 channels, wherein each channel represents an intensity for one energy interval. If values of the intensity information item are provided in at least about 20 channels, the resolution of the spectral image and thus also the accuracy of the determination of the output variable can be improved. In particular, the intensity information item comprises at least from about 20 channels to about 250 channels, thus achieving a more accurate dependence of the output variable on the composition of the soiling. Using at least about 20 channels, energy intervals can be achieved in an intensity information item representative of a spectral image, in particular for a hyperspectral image, that represent that which can not be resolved by the human eye, which has only three channels in the visible region.

According to a further embodiment of the method, if the intensity information item is representative of spectral components of a spectral image, wherein at least one of the spectral components lies outside the visible energy range, the composition of the soiling and/or one or more properties of the textile can be incorporated into the determination of the output variable with increased accuracy.

In particular, the intensity information item is representative of spectral components of a spectral image in the ultraviolet energy range. Likewise, spectral components in the infrared energy range can be taken into account. The intensity information item is in particular representative of spectral components of a spectral image from the infrared energy range to the ultraviolet energy range, for example, at least for spectral components of a spectral image having wavelengths from about 315 nm to about 1400 nm, preferably for wavelengths from about 280 nm to about 3000 nm, more preferably for wavelengths of from about 200 nm to about 5000 nm.

Furthermore, the intensity information item can be representative of spectral components of a (hyper)spectral image in the visible energy range, that is, in the wavelength range from about 380 nm to about 780 nm.

The intensity information item can be representative of a single image point of the spectral image. In particular, however, in one embodiment of the method, the intensity information item is representative of spatially resolved portions of a spectral image. A spatially resolved intensity pattern comprises the information item about the intensity of the radiation at at least two positions in space. The spatially resolved intensity pattern can, for example, be measured by a movable optical sensor, wherein the position of the optical sensor is varied and an intensity is measured at each position. However, it is preferred to use an optical sensor with a plurality of spatially-spaced sensor elements, for example, pixels, wherein spatially resolved intensity information item can be obtained via the intensity information item in the various pixels.

Conceivable here is a one-dimensional, for example, linear resolution. In one embodiment of the method, however, a two-dimensional spatial resolution is made. In particular, the spatial resolution is made via a planar arrangement of sensor elements or at least one sensor field, for example, pixels.

In one embodiment of the method and/or the device, the determination of the intensity information item representative of spatially resolved portions of a spectral image is made via an integrated camera of an electrical device, in particular via a hyperspectral camera, which is configured to determine an intensity information item representative of a hyperspectral image. Such a hyperspectral image can also be represented by an intensity information item that by illuminating the soiling and/or the structure of a textile in a broadband visible region, there is a detection of image information items comprising the illuminated soiling and/or structure of a textile, a determining of at least a reflection information item and a reconstruction of the hyperspectral image.

In an alternative or additional embodiment, a determination of the intensity information item can be made via a sensor, wherein the sensor is arranged on a cleaning device. For example, the sensor is at least partially arranged on the outer housing of a cleaning device and outside a cleaning container in which a cleaning can be performed. The user therefore always has access to the sensor, even if the cleaning device is in operation or switched off. Thus, a method according to the first aspect can be made at any time. The sensor can be fixed to the cleaning device in this case, for example, via a fastening element such as a screw connection and/or bonding. Likewise, the sensor can also be arranged freely positionable on the cleaning device via a positioning element, for example, via a magnetic holder.

Furthermore, the sensor can be arranged at least partially in the interior of the cleaning device, in particular in the region of a cleaning container of the cleaning device in which cleaning can be performed. In particular, the sensor is arranged here at a position accessible to the user. The sensor can also be fixed to the cleaning device here, for example, be freely positionable via a fastening element or a positioning element. The sensor is arranged, for example, at an opening of the cleaning container, in particular on a door. In a washing machine, the sensor is arranged, for example, on the loading hatch of the laundry drum and/or on the seal of the loading hatch.

Likewise, the sensor can be designed freely movable in the interior of the cleaning container. In one embodiment, a determination device is provided, the determination device comprising: at least one sensor element for determining the intensity information item and optionally at least one illumination element, wherein the device is configured to provide the intensity information item during the performance of a treatment of the textile in a cleaning container of a cleaning device. For example, the determination device is configured to be arranged freely movably in a washing drum of a washing machine during a washing process. The determination device can have a shape corresponding to the cleaning treatment and, for example, have a rounded, in particular spherical shape. The determination device can also have a corresponding density and mechanical resistance, so that a washing solution and also aggressive cleaning agents do not affect the function of the detection device. The determination device can thus provide intensity information items of the soiling during a cleaning operation to monitor the treatment of the textile. A determination of the intensity information item can be provided both for a soiling on the surface of a textile and/or also comprise soilings such as dissolved textile constituents such as textile dyes, for example, by an examination of the washing solution. A determination of the intensity information item can take place here in transmission and/or reflection and emission.

In particular, at least one sensor, which is located at least partially outside the cleaning container, is combined with at least one sensor, which is located at least partially within the cleaning device or within the cleaning container and which in particular is freely movable. A plurality of sensors of the same or different design can be provided. This improves the accuracy of the determination of the at least one output variable, since the sensors having different positions can provide corresponding intensity information items. In particular, at least one of the sensors operates continuously at least at times, so that intensity information items are obtained at different times and in particular continuously during a cleaning treatment.

Likewise, at least one sensor can be arranged on a part of a cleaning agent package and be integrated, for example, into a closure cap or be arranged on a closure flap, in particular by being plugged on. Thus, the sensor is free and movable independent of a cleaning device and can be used by the user in a simple way on a soiling of a textile. Likewise, the sensor can then be used in conjunction with a plurality of different cleaning devices.

In an alternative or additional embodiment, a determination of the intensity information item can be made via a sensor, wherein the sensor is arranged on an electronic device, for example, a smart phone, tablet or the like. For example, the camera-like element, which is often already comprised in such an electronic device, can be used for this purpose. Additionally or alternatively, the illumination of the soiling of the textile and/or the at least one part of the textile can be performed by employing an illumination element. This illumination element can be comprised, for example, by the electronic device. For example, this can often be used for the display often already comprised by such an electronic device. For illumination, the display can accordingly emit a light corresponding to the desired wavelength range, with which the soiling of the textile and/or at least one part of the textile is illuminated.

According to one embodiment of the method according to the first aspect, the method further comprises subjecting the intensity information item to a processing algorithm.

In this way, on the one hand, a better differentiation of different compositions of the soiling of the textile and/or of one or more textile properties can be achieved. For example, the intensity information item is subjected to a conversion algorithm. For example, a conversion of the determined intensity information item (for example, one or more image information items) from a first representation space into a second representation space can be done, for example, from a first color space to a second color space. Examples of color spaces are, for example, an RGB color space or an L*a*b* color space. For example, the determined image information item is converted from an RGB color space into an L*a*b* color space.

An RGB color space is understood as meaning an additive color space, which reproduces color perceptions by the additive mixing of three basic colors (red, green and blue). An example of an L*a*b* color space is, for example, the CIELAB color space, which is standardized in EN ISO 11664-4 "Colorimetry-Part 4: CIE 1976 L*a*b* Colour space" (CIE 1976 color space). It is advantageous here that colors are defined independently of the type of their generation or reproduction technique, as they are perceived by a normal observer in a standard lighting condition (device independence and perception relatedness).

In particular, an evaluation of color differences between pixels of an image information item can be made to determine the at least one output variable. □E can be used for this purpose, in particular methods based on the color difference or the color distance. In particular, the calculation of □E is made in the CIELAB color space. Likewise, the brightness in the intensity information item can be used to determine the at least one output variable.

In an exemplary embodiment of the method according to the first aspect, the method further comprises the following method steps:

detecting at least one voice command indicative of at least one parameter, on the basis of which the at least one output variable is determined.

The voice command can be input, for example, by a user, for example, via a voice communication interface (for example, an electronic device comprising a microphone or the like). The input voice command in this case can be processed, for example, locally on the part of the voice communication interface or on the part of a server. For processing on the part of a server, the voice command can be transmitted to a server, for example, after input via a communication connection of the electronic device. The input voice command can be processed, for example by employing a speech recognition software (for example, Apple Sin or Amazon Echo). This can require the installation of additional software. For example, a voice command processed in this way can be converted into a control information item which the electronic device and/or a further electronic device (for example, a cleaning device) can, for example, evaluate, process, forward, or otherwise use.

For example, a corresponding control information item can be taken into account in determining the output variable or the treatment parameter.

In one exemplary embodiment of the present disclosure according to all aspects, a status information item is obtained (for example, determined). The status information item can be output, for example, or its output can be caused.

For example, in a system, for example, each cleaning device can have a wireless communication interface (for example, WLAN, WAN, Zigbee, Bluetooth, to name but a few examples) for the transmission of a status information item. For example, the status information item can be transmitted based on a query to a home appliance controller centrally installed in the household (for example, a desktop computer, a central control unit, a server, a home automation system), and/or a (for example, mobile) smart device (such as a smart phone, a tablet, a smart watch, to name just a few examples). The status information item can be output, for example, displayed on a display device of the smart device to the user.

For example, the status information item can be indicative of a cleaning and/or care action. Alternatively or additionally, the status information item can be indicative of a progress, cancel, completion, start, or a further status of a cleaning operation. Alternatively or additionally, the status information item can be indicative of properties of the soiling and/or textile.

According to the second aspect of the present disclosure, an alternative device is also described, comprising at least one processor and at least one memory having computer program code, wherein the at least one memory and the computer program code are configured to execute and/or to control at least one method according to the first aspect with the at least one processor. For example, a processor is understood as meaning a control unit, a microprocessor, a microcontrol unit such as a microcontroller, a digital signal processor (DSP), an application specific integrated circuit (ASIC), or a field programmable gate array (FPGA).

For example, an exemplary device further comprises an element for storing information items such as a program memory and/or a main memory. For example, an exemplary device as contemplated herein further comprises an element for receiving and/or sending information item over a network, such as a network interface. For example, exemplary devices as contemplated herein are connected to each other and/or connectable to each other via one or more networks.

An exemplary device according to the second aspect is or comprises, for example, a data processing system that is configured in terms of software and/or hardware in order to be able to execute the respective steps of an exemplary method according to the second aspect. Examples of a data processing system include a computer, a desktop computer, a server, a thin client and/or a portable computer (mobile device), such as a laptop computer, a tablet computer, a wearable, a personal digital assistant or a smart phone.

Individual method steps of the method according to the first aspect (for example, obtaining or determining an intensity information item, determining the at least one output variable) can in this case be performed using a sensor device which also has at least one sensor element. Likewise, individual method steps (for example, obtaining or determining intensity information items, determining the at least one output variable), which, for example, need not necessarily be performed directly with the sensor device, can be made by a further device, which in particular communicates with the device which has at least one sensor element via a communication system.

Further devices can be provided, for example, a server and/or, for example, a part or a component of a so-called computer cloud, which provides data processing resources dynamically to different users in a communication system. A computer cloud is understood, in particular, as meaning a data processing infrastructure as defined by the National Institute for Standards and Technology (NIST) for the English term "cloud computing". An example of a computer cloud is a Microsoft Windows Azure Platform.

According to the second aspect of the present disclosure, there is also described a computer program comprising program instructions that cause a processor to execute and/or control a method according to the first aspect when the computer program is run on the processor. An exemplary program as contemplated herein can be stored in or on a computer-readable storage medium containing one or more programs.

According to the second aspect of the present disclosure, there is also described a computer-readable storage medium containing a computer program according to the second aspect. A computer-readable storage medium can be formed, for example, as a magnetic, electrical, electro-magnetic, optical and/or other type of storage medium. Such a computer-readable storage medium is preferably graphical (that is, "touchable"), for example, it is formed as a data carrier device. Such a data carrier device is for example, portable or permanently installed in a device. Examples of such a data carrier device are volatile or non-volatile random access memory (RAM) such as NOR flash memory or having sequential access such as NAND flash memory and/or read-only access memory (ROM) or read-write access. For example, computer readable is to be understood as meaning that the storage medium can be read and/or written by a computer or a data processing system, for example, by a processor.

According to the third aspect of the present disclosure, there is also described a system comprising a plurality of devices, in particular, a mobile device and a cleaning device, which together perform a method according to the first aspect.

An exemplary system according to the third aspect comprises an exemplary cleaning device and additionally a further device, a mobile device or a server for performing an exemplary method according to the first aspect.

The exemplary embodiments of the present disclosure described above in this description are also to be understood as being disclosed in all combinations with one another. In particular, exemplary embodiments are to be understood in terms of the different aspects disclosed.

In particular, the preceding or following description of method steps according to preferred embodiments of a method also discloses a corresponding element for performing the method steps by preferred embodiments of a device. Likewise, the disclosure of elements of a device for performing a method step is intended to also disclose the corresponding method step.

Further advantageous exemplary embodiments of the present disclosure can be found in the following detailed description of some exemplary embodiments of the present disclosure, in particular, in conjunction with the figures. However, the figures should only serve the purpose of clarification, but not to determine the scope of the present disclosure. The figures are not to scale and are merely intended to reflect the general concept of the present disclosure. In particular, features included in the figures should by no means be considered as a necessary component of the present disclosure.

Figure 3:
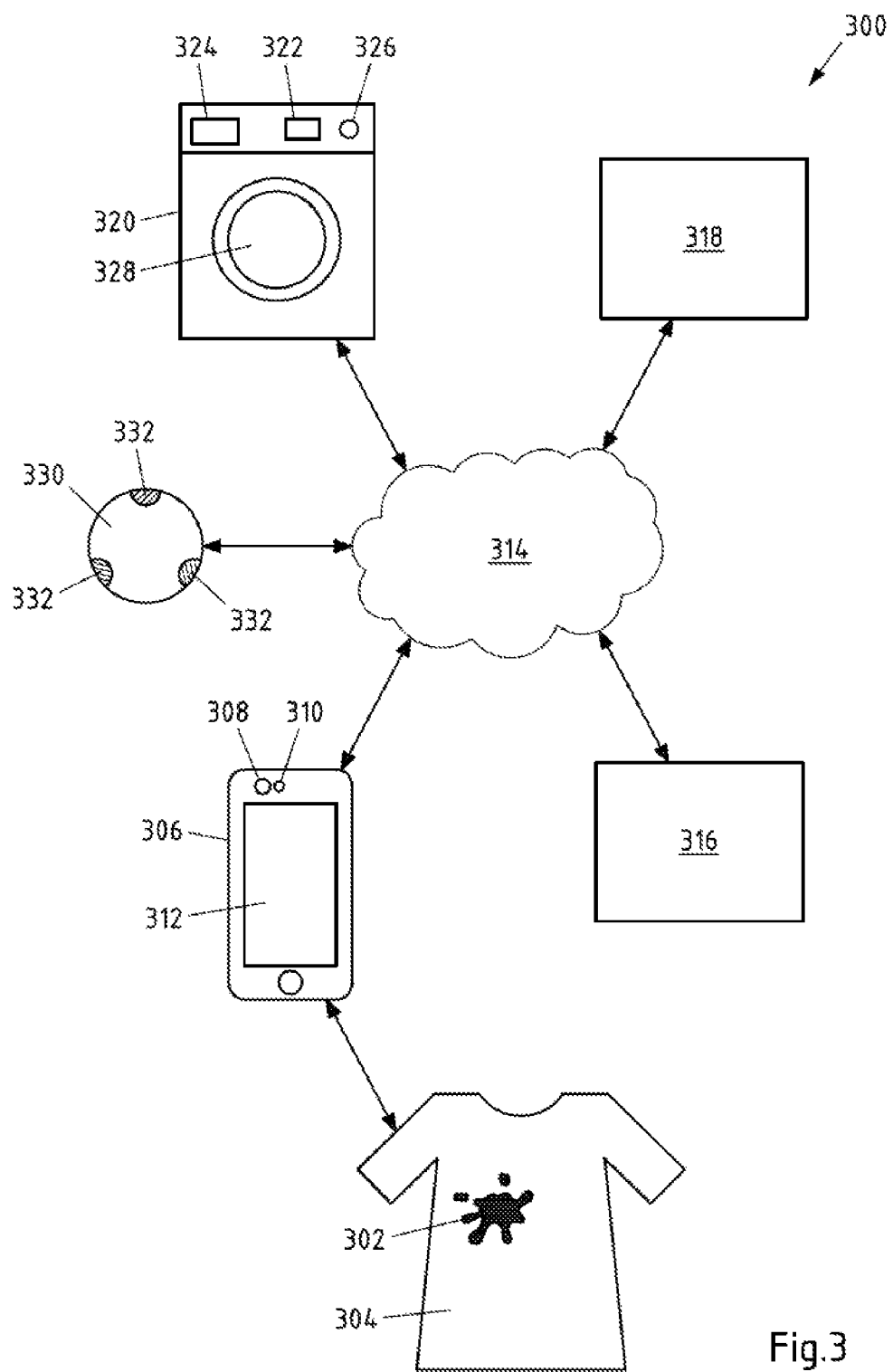
FIG. 3 is a schematic representation of an embodiment of a device according to the second aspect.
Figure 4:
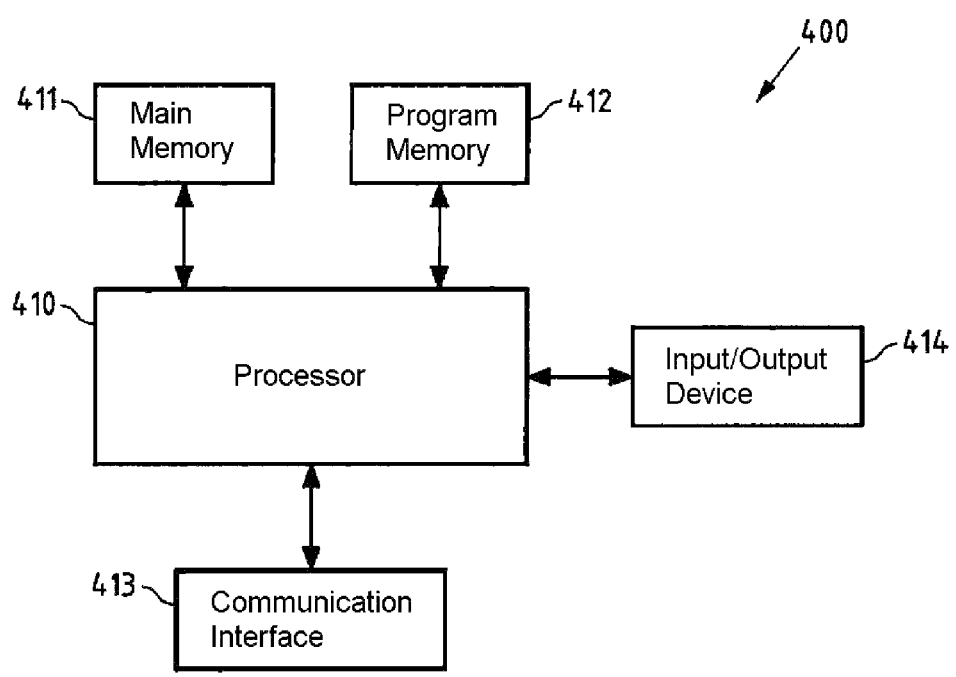
FIG. 4 is a block diagram of an embodiment of a device according to the second aspect.

FIG. 1 shows a flowchart 100 of an embodiment of a method according to the first aspect, which can be performed by a device, for example, one of the devices from FIG. 3 and/or FIG. 4.

The determination or obtaining of an intensity information item takes place in a step 110. The intensity information item can be determined, for example, in the form of an intensity distribution via an optical sensor element. The intensity information item represents a spectral image resulting from soiling of a textile and/or from at least one part of a structure of a textile. Both the soiling and at least one part of the structure can originate from the same textile. The intensity information item is in particular representative of a (for example, hyper-) spectral image and comprises intensity values in a plurality of channels, which represent, for example, broadband wavelength ranges. In this case, at least two of the wavelength ranges can be broadband such that at least parts of these ranges overlap each other or at least adjoin one another.

The determination of the intensity information item comprises the steps 111 to 114. The illumination of the soiling of the textile and/or of the at least one part of the textile with light takes place in step 111, comprising at least one broadband wavelength range. In particular, a repeated (for example, sequential) illumination of the soiling and/or the at least one part of the textile can take place, for example, in the broadband wavelength ranges from about 380 nm to about 490 nm (corresponds to the color blue), from about 490 nm to about 600 nm (corresponds to the color green), and from about 600 nm to about 780 nm (corresponds to the color red).

Image information items of the illuminated soiling of the textile and/or the at least one part of the textile are detected in step 112. The detection of the image information items can be done, for example, for each illumination with light comprising a broadband wavelength range. For example, if illumination occurs three times, as mentioned above, for example, corresponding image information items are detected three times. The detection of the image information items can be done, for example, using a camera-like element. The camera-like element can be encompassed, for example, by an electronic device, for example, by a smart phone, tablet or the like. The illumination can be done for example, with an illumination element, for example, by employing a display of an electronic device, such as a smart phone, tablet or the like. The camera-like element and the illumination element can be comprised by one and the same electronic device.

At least one reflection information item is determined in step 113. The reflection information item is indicative of the reflected portion of the light from the broadband wavelength range. These are found again in the wavelengths corresponding channels of the detected image information item.

A spectral image is reconstructed in step 114, wherein the at least one reflection information item is evaluated.

Accordingly, to generate the spectral image, in particular a hyperspectral image, the soiling on the textile and/or at least one part of the textile is successively illuminated in broadband in red, blue and green. The light reflected thereby can be read from the red, blue and green channels of the sensor pixels, which are detected by the camera-like element as image information items. The reflection spectrum can be reconstructed as a spectral image from this data.

At least one output variable dependent on the soiling of the textile and/or on at least one property of the textile is determined from the intensity information item in step 120. For this purpose, for example, a classification of the determined intensity information item can be performed in order to be able to determine the corresponding output variable. This is done by employing an adaptive evaluation algorithm, for example, a neural network. In order to be able to achieve the most accurate classification results, the neural network is calibrated, for example, on the basis of defined training cases. Subsequently, optimizations can be made from evaluations performed on the basis of the training cases, wherein the input vectors, output vectors and thus associated intensity information items used by the neural network are adapted in their parameters.

An output of the at least one output variable or the output thereof is caused in step 131. For example, an output can be made on a display element, wherein in particular indications of the composition of the soiling and/or properties with respect to the textile and at least one treatment parameter, for example, comprising a cleaning strategy, are displayed to the user. The user can perform a treatment (for example, cleaning) of the textile based on the displayed information item or recommendation.

Additionally or alternatively, an output of the at least one output variable to a cleaning device can take place in step 132. In addition, for example, a treatment parameter comprising a cleaning strategy can also be output to a cleaning device. The output treatment parameters of the cleaning strategy are used in step 142 to perform a cleaning by employing the cleaning device. Alternatively, in step 141, the treatment of the textile can be performed, for example, manually by a user.

Figure 2A:
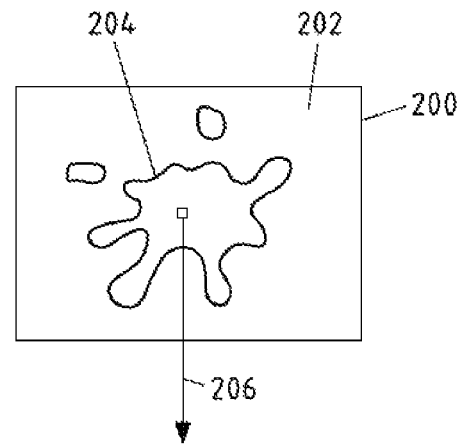
FIG. 2*a*-*c* are schematic representations of a spectral image or of intensity information items representative for this purpose.

FIG. 2a shows a schematic representation of a spectral image 200 of a textile 202 having a soiling 204. The spectral image 200 results in particular from the illumination of the surface of the soiling 204 on the textile 202 with light, wherein in particular radiation emanates by reflection and emission from the surface of the soiling 204 and/or the textile 202. These can be detected as reflection information item, for example, by a physical measurement, in particular via an optical sensor element. An intensity information item, which is representative of the spatial resolution of the spectral image 200, can be recorded in particular via a plurality of sensor elements, for example, pixels, wherein the pixels are arranged two-dimensionally on a surface.

Figure 2B:
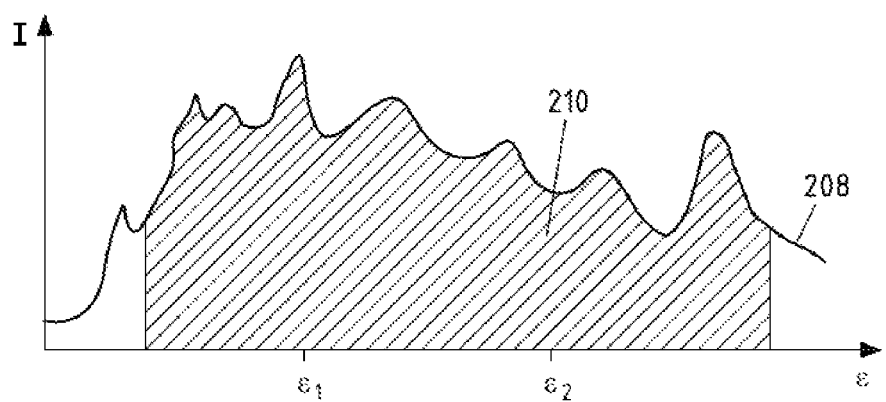
Figure 2C:
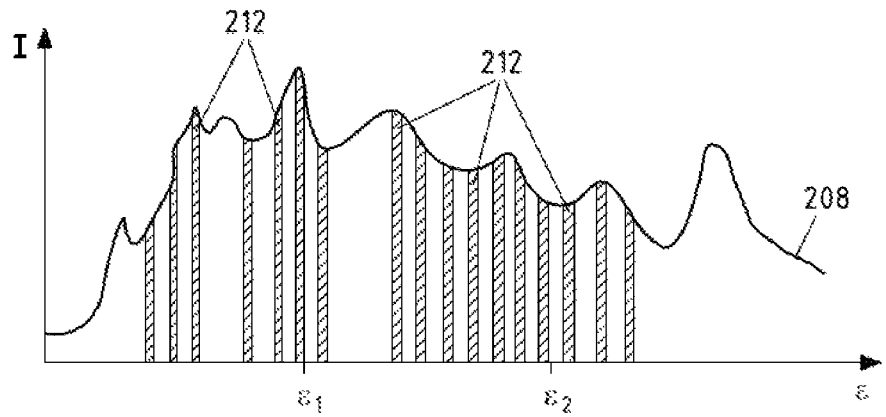

FIGS. 2b and 2c show in schematic views intensity distributions 210, 212 which are representative of spectral components of the spectral image 200. The spectrum 208 results for a limited spatial section of the spectral image 200, represented by the arrow 206. If the spectrum 208 is measured via an optical sensor element, for example, a pixel of an optical sensor, an intensity distribution 210 can be obtained, wherein the intensity distribution 210 is representative of the spectral image 200 resulting from the illuminated surface of the soiling 204 and/or the textile 202. The intensity distribution 210 is shown in FIG. 2b as a hatched area.

The intensity distribution 210 in FIG. 2b here is representative of a hyperspectral image, wherein the intensity distribution 210 comprises values in at least 20 channels to 250 channels, wherein each channel represents an intensity for an energy interval (for example, wavelength range of visible light from about 380 nm to about 780 nm). The intensity distribution 210 has intensity values in channels for energy intervals or broadband wavelength ranges, wherein the energy intervals or broadband wavelength ranges adjoin or overlap each another. Thus, as shown in FIG. 2b, the intensity distribution 210 is representative of an at least partially continuous spectrum.

In addition, the intensity distribution 210 in FIG. 2b is representative of spectral components of the spectral image 208 that lie outside the visible energy range or wavelength range of light. The visible energy range is δεσιγνατεδ in FIG. 2b via the lowest visible energy $\varepsilon_1$ and the highest visible energy $\varepsilon_2$. The intensity distribution 210 here is representative of spectral components of the infrared energy range (energy $\varepsilon$ less than $\varepsilon_1$) up to the ultraviolet energy range (energy $\varepsilon$ greater than $\varepsilon_2$). Alternatively, the intensity distribution can be representative of spectral components of the spectral image that lie exclusively within the visible energy range or wavelength range of light.

FIG. 2c shows an intensity distribution 212 representative of a multispectral image in a schematic view. The intensity distribution 212, like the intensity distribution 210 according to FIG. 2b, likewise comprises intensity values in a plurality of channels for different energy intervals or wavelength ranges. However, the energy intervals or wavelength ranges lie spaced apart from each another and intensities of individual energies or wavelengths delimited from each other are reproduced. Thus, the intensity distribution 212 in particular is not representative of a continuous spectrum. The intensity distribution 212 is also representative of spectral components from the infrared energy range to the ultraviolet energy range. Alternatively, the intensity distribution of a multispectral image can be representative of spectral portions of the spectral image that lie exclusively within the visible energy range or wavelength range of light.

FIG. 3 shows an embodiment of a device 300 according to the second aspect or a system 200 according to the third aspect. The device 300 is configured as or comprises a corresponding element for performing and/or controlling a method according to the first aspect.

In particular, the device 300 allows the identification of a composition of a soiling 302 on a textile 304 and/or provides an identification regarding properties of the textile 304. For example, a recommendation for treating the textile 304 to remove the soiling 302 from the textile 304 can be provided based on this information item or these information items.

An intensity information item representative of a spectral image resulting from the illuminated surface of the soiling 302 on the textile 304 is first detected using an electronic device, here a smart phone 306. For this purpose, in particular an optical sensor element 308 is used, which can comprise a camera, for example. In addition, a radiation source 310 is provided which serves to illuminate the surface of the soiling 302 and/or the textile 304. The smart phone 306 also has a display element 312. The display element 312 can also be used, for example, to illuminate the surface of the soiling 302 and/or the textile 304 and, accordingly, as a radiation source.

The determined intensity information item is obtained from a communication system 314. A determination device 316 communicates with the communication system 314, which determination device is configured to determine at least one output variable dependent on the composition of the soiling 302 and/or at least one property of the textile 304 from the intensity information item. The determination device 316 can also comprise an evaluation unit. Alternatively or additionally, a dedicated evaluation unit can be used, which, for example, communicates with the communication system 314. The evaluation unit can determine the output variable, for example, on the basis of an adaptive evaluation algorithm, in particular a neural network.

The determination of the output variables here comprises a comparison of the intensity information item with comparison values. The comparison values are stored in a database 318, which is also in communication with the communication system 314. In particular, the comparison values of database 318 contain intensity information items of soilings typically occurring in the household. These can be given as training cases by an input vector, an intensity information item and an output vector and stored accordingly in the database. The training cases can be used, for example, by a neural network in order to be able to determine an output variable at least partially based on an obtained or determined intensity information item by the neural network, wherein the output variable is dependent on the soiling and/or on at least one property of the textile based on the determined intensity information item. Furthermore, the database 318 contains data associated with the comparison values in the form of a chemical composition and treatment parameters with regard to a treatment to be recommended which is optimal for the corresponding composition and/or textile.

The at least one output variable comprises treatment parameters of such a cleaning strategy as treatment of the textile, wherein the treatment parameter comprises a cleaning agent type, an amount of cleaning agent, a cleaning temperature, a type of cleaning device and settings of a cleaning device 320. These output variables can be displayed, for example, on the display element 312 of the smart phone 306 and thus made available to the user. The user is thus provided with a recommendation for an optimal treatment for the specific soiling 302.

The cleaning device 320 is also in communication with the communication system 314, whereby the output variables can be output to the cleaning device 320. The cleaning device 320 has a display element 322, which in particular can display the output variables. Furthermore, the cleaning device 320 has a dosing device 324 for cleaning agents. In this case, the dosing device 324 can provide a cleaning agent in accordance with the treatment parameters with respect to the cleaning agent type and/or the amount of cleaning agent, or check whether the cleaning agent has been introduced into the dosing device 324 in accordance with the recommended treatment of the textile 304.

Furthermore, the cleaning device 320 has an operating element 326, which allows the control of the cleaning device 320 by a user. The cleaning device 320 adopts the treatment parameters as a default in this case. The user then has the option of following the recommendation of the cleaning strategy and simply starting the cleaning device 320 via the operating element 326 or performing one's own manual setting of the cleaning device 320 via the operating element 326. The cleaning is performed in a cleaning container 328, here a laundry drum.

Furthermore, a determination device 330 is shown in FIG. 3. The determination device 330 comprises sensor elements 332 and optionally at least one illumination element (not shown). The detection device has such a shape that when used in a cleaning device, neither the cleaning device nor the laundry can be damaged by the detection device 330. Accordingly, the determination device 330, for example, has a spherical shape, but also other particular shapes without pointed corners and edges are conceivable. The determination device 330 is configured to be arranged in the cleaning container 328 while performing a cleaning. The determination device 330 is in this case freely movable and resistant to an action of the washing solution in the cleaning container 328. The determination device 330 can thus provide intensity distributions of the soiling 302 during a cleaning operation in order to monitor the treatment. The determination device 330 can also detect intensity distributions of soluble, unfixed textile dyes in the washing solution. Thus, a dissolving of the corresponding textile dyes from the textile 304 can be monitored.

FIG. 4 shows a block diagram of an embodiment of a device 400, which, in particular, can execute an exemplary method according to the first aspect. The device 400 is, for example, a device according to the second aspect or a system according to the third aspect.

The device 400 can be, for example, a computer, a desktop computer, a server, a thin client, or a portable computer (mobile device), such as a laptop computer, a tablet computer, a personal digital assistant (PDA), or a smart phone. For example, the device can fulfill the function of a server or a client.

Processor 410 of device 400 is particularly formed as a microprocessor, microcontrol unit, microcontroller, digital signal processor (DSP), application specific integrated circuit (ASIC) or field programmable gate array (FPGA).

Processor 410 executes program instructions stored in program memory 412 and, for example, stores intermediate results or the like in working or main memory 411. For example, program memory 412 is a nonvolatile memory such as a flash memory, a magnetic memory, an EEPROM memory (electrically erasable programmable read only memory), and/or an optical memory. Main memory 411 is, for example, a volatile or non-volatile memory, in particular, a random access memory (RAM) such as a static RAM (SRAM), a dynamic RAM (DRAM), a ferroelectric RAM (FeRAM) and/or a magnetic RAM memory (MRAM).

Program memory 412 is preferably a local data carrier permanently attached to device 400. Data carriers permanently connected to the device 400 are, for example, hard disks which are built into the device 400. Alternatively, the data carrier can, for example, also be a data carrier which can be connected in separable manner to the device 400, such as a memory stick, a removable data carrier, a portable hard disk, a CD, a DVD and/or a diskette.

Program memory 412 contains, for example, the operating system of device 400, which is at least partially loaded into main memory 411 and executed by processor 410 when device 400 is started. In particular, when device 400 starts, at least one part of the kernel of the operating system is loaded into main memory 411 and executed by processor 410. The operating system of device 400 is, for example, a Windows, UNIX, Linux, Android, Apple iOS, and/or MAC operating system.

In particular, the operating system enables the use of the device 400 for data processing. It manages, for example, resources such as main memory 411 and program memory 412, communication interface 413, input and output device 414, provides basic functions, among other things through programming interfaces, to other programs and controls the execution of programs.

Processor 410 controls communication interface 413, which can be, for example, a network interface and can be in the form of a network card, network module and/or modem. The communication interface 413 is, in particular, configured to establish a connection of the device 400 to other devices, in particular, via a (wireless) communication system, for example, a network, and to communicate with them. The communication interface 413 can, for example, receive data (via the communication system) and forward it to processor 410 and/or receive and send data (via the communication system) from processor 410. Examples of a communication system are a local area network (LAN), a wide area network (WAN), a wireless network (for example, according to the IEEE 802.11 standard, the Bluetooth (LE) standard and/or the NFC standard), a wired network, a mobile network, a telephone network and/or the Internet.

Furthermore, processor 410 can control at least one input/output device 414. Input/output device 414 is, for example, a keyboard, a mouse, a display unit, a microphone, a touch-sensitive display unit, a loudspeaker, a reading device, a drive and/or a camera. For example, input/output device 414 can receive inputs from a user and forward them to processor 410 and/or receive and output information item to the user of processor 410.

Figure 5:
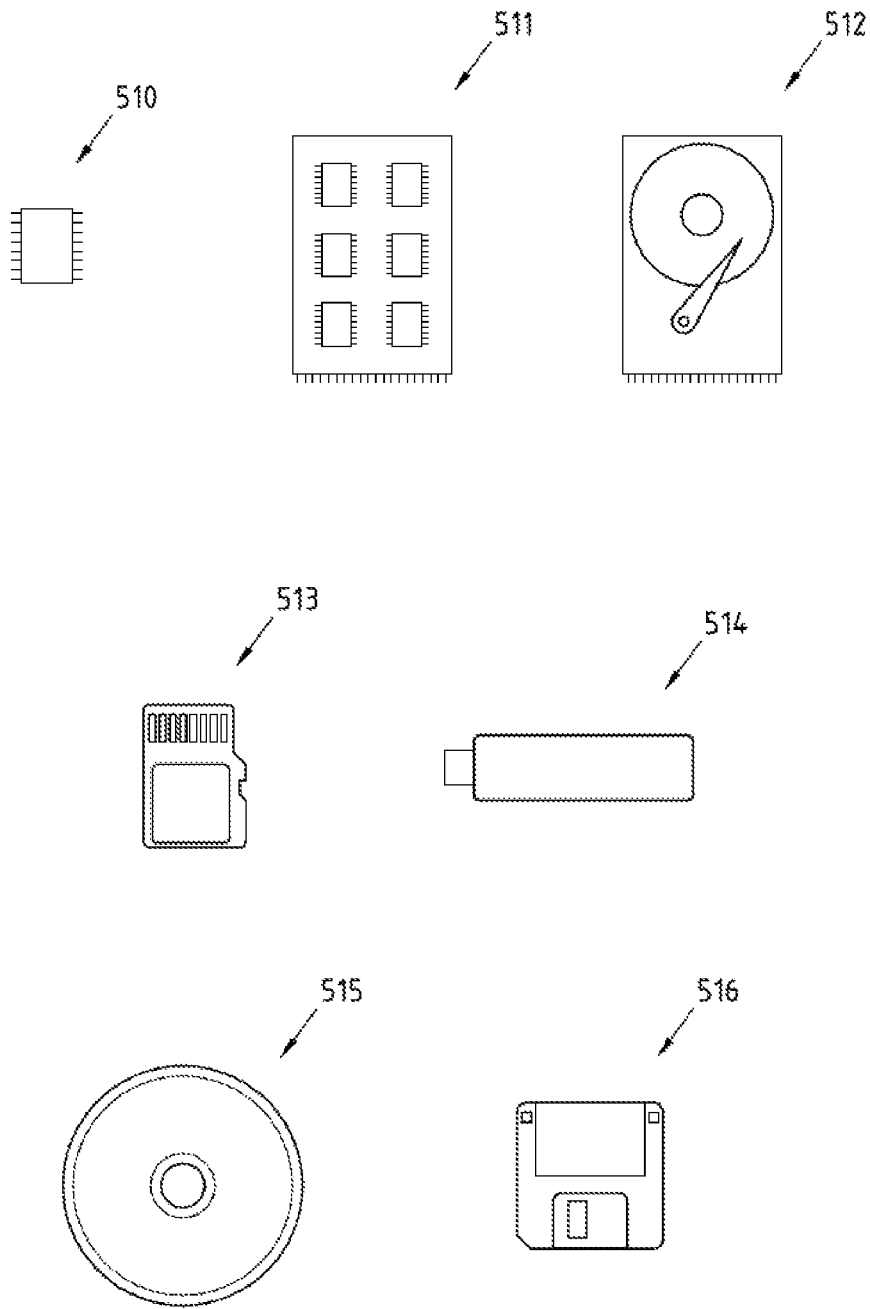
FIG. 5 illustrates different embodiments of a storage medium according to the second aspect.

Finally, FIG. 5 shows different embodiments of storage media on which an embodiment of a computer program as contemplated herein can be stored. The storage medium can be, for example, a magnetic, electrical, optical and/or other type of storage medium. For example, the storage medium can be part of a processor (for example, processor 410 of FIG. 4), such as a (non-volatile or volatile) program memory of the processor or a part thereof (such as program memory 412 in FIG. 4). Embodiments of a storage medium are a flash memory 510, an SSD hard disk 511, a magnetic hard disk 512, a memory card 513, a memory stick 514 (for example, a USB stick), a CD-ROM or DVD 515, or a diskette 516.

The following embodiments should also be understood as being disclosed:

Embodiment 1

A method performed by one or more devices, comprising:
obtaining an intensity information item representative of a spectral image resulting from a soiling of a textile and/or from at least one part of a textile;
determining at least one output variable from the intensity information item dependent on the soiling of the textile and/or on at least one property of the textile, wherein the output variable is determined by employing an adaptive evaluation algorithm, in particular an artificial neural network, wherein parameters of the adaptive evaluation algorithm are calibrated based on a plurality of training cases;
outputting or triggering an outputting of the at least one treatment variable.

Embodiment 2

Method according to embodiment 1, wherein the output variable is indicative of a specific soiling of the textile and/or a specific part of the textile.

Embodiment 3

Method according to the embodiment 1 or 2, wherein obtaining the intensity information item comprises the following steps:
(i) illuminating the soiling of the textile and/or the at least one part of the textile with light comprising at least one broadband wavelength range (for example, in particular wavelength ranges for visible region red, green, and/or blue, illuminating with a light source);
(ii) detecting image information items of the illuminated soiling of the textile and/or the illumined at least one part of the textile;
(iii) determining at least a reflection information item indicative of the reflected portion of the wavelength range from the wavelength channels of the image information items corresponding to the at least one broadband wavelength;
(iv) reconstructing a spectral image (reflection spectrum), wherein an evaluation of the at least one reflection information item takes place.

Embodiment 4

Method according to embodiment 3, wherein the illumination of the soiling of the textile and/or of the at least one part of the textile takes place with one of the following broadband wavelength ranges:
(i) from about 600 nm to about 780 nm; (corresponds to broadband red)
(ii) from about 490 nm to about 600 nm; (corresponds to broadband green)
(iii) from about 380 nm to about 490 nm; (corresponds to broadband blue)
(iv) or a combination thereof.

Embodiment 5

Method according to one of the preceding embodiments, wherein the output variable is determined by employing an artificial neural network, wherein parameters of the artificial neural network are calibrated on the basis of a plurality of training cases.

Embodiment 6

Method according to embodiment 5, wherein each of the training cases is given by an input vector, an intensity information item and an output vector, and the output vector is given within this soiling of a textile and/or part of the structure of a textile belonging to the training case by substance concentrations determined by employing chemical analysis.

Embodiment 7

A method according to embodiment 5 or 6, wherein each test case is generated by converting the soiling of a textile and/or a part of the structure of a textile belonging to the training case into a predetermined one, and then generating an intensity information item representative of a spectral image, and at the same time performing a chemical analysis to measure the substance concentration, in particular the soiling on the textile, and transmitting the determined intensity information item as the input vector, and the substance concentration as the output vector of the training case.

Embodiment 8

Method according to one of the preceding embodiments, wherein at least one image point within the spectral image is used as a fixed predetermined reference image point for a spectral exposure compensation of the image, wherein image data of image points of the image which are different from the at least one reference image point are normalized using image data of the at least its reference image point.

Embodiment 9

Method according to one of the preceding embodiments, wherein the at least one part of the structure of a textile is indicative of material structure, material type, material distribution, material wear of the textile or a combination thereof.

Embodiment 10

Method according to one of the preceding embodiments, wherein the at least one part of the structure of a textile is indicative of the height, the shape and/or number of pillings on the textile.

Embodiment 11

Method according to one of the preceding embodiments, wherein the at least one part of the structure of a textile is indicative of the presence and/or type of closure element, of coating material and/or of applications in, on and/or on the textile.

Embodiment 12

Method according to one of preceding embodiments, the method further comprising:
determining at least one treatment parameter of the textile based at least in part on the determined intensity information item; and
outputting or triggering an outputting of the at least one treatment parameter.

Embodiment 13

Method according to one of the preceding embodiments, wherein the at least one treatment parameter is indicative of a cleaning agent type, an amount of cleaning agent, a cleaning temperature, a type of cleaning device, settings of a cleaning device, or a combination thereof.

Embodiment 14

Method according to one of preceding embodiments, the method further comprising:
performing or causing the performance of a treatment of the textile corresponding to the at least one determined treatment parameter via at least one treatment device, in particular a cleaning device.

Embodiment 15

Method according to one of the preceding embodiments, wherein the intensity information item is determined before, during and/or after a treatment of the textile.

Embodiment 16

Method according to one of the preceding embodiments, wherein at least one optical sensor element is used to determine the intensity information item.

Embodiment 17

Method according to the embodiment 16, wherein the optical sensor element provides a three-dimensional spatial resolution.

Embodiment 18

Method according to embodiment 16 or 17, wherein the at least one optical sensor element comprises at least one camera-like element and provides an image information item of the soiling of the textile and/or the at least one part of the structure of a textile.

Embodiment 19

Device which is configured as or comprises a corresponding element to perform and/or to control a method according to one of embodiments 1 to 18.

Embodiment 20

Device comprising at least one processor and at least one memory having computer program code, wherein the at least one memory and the computer program code are configured with the at least one processor to execute and/or to control at least one method according to one of the embodiments 1 to 18.

Embodiment 21

Device according to the embodiment 19 or 20, wherein the device is an electronic device, such as a smart phone, or a modular device, which in particular can be arranged on a treatment device, in particular on a cleaning device (for example, washing machine), comprising a camera sensor and an evaluation unit.

Embodiment 22

Computer program comprising program instructions that cause a processor to execute and/or control a method according to one of the embodiments 1 to 18 when the computer program is run on the processor.

Embodiment 23

Computer readable storage medium containing a computer program according to the embodiment 22.

Embodiment 24

A system comprising:
a plurality of devices, in particular at least one electronic device and a treatment device, which together perform a method according to one of the embodiments 1 to 18.

The exemplary embodiments of the present disclosure described in this specification and the respective optional features and properties cited in this context should also be understood to be disclosed in all combinations with one another. In particular, the description of a feature encompassed by an exemplary embodiment is, unless explicitly explained to the contrary, not to be understood in this case as meaning that the feature is essential or fundamental for the function of the embodiment. The sequence of the method steps described in this specification in the individual flowcharts is not mandatory, alternative sequences of the method steps are conceivable. The method steps can be implemented in various ways, so that an implementation in software (by program instructions), hardware, or a combination of both to implement the method steps is conceivable.

Terms used in the patent claims, such as "comprising", "having", "including", "containing" and the like, do not exclude further elements or steps. The phrase "at least partially" includes both the "partial" and "completely" cases. The phrase "and/or" is to be understood as meaning that both the alternative and the combination is intended to be disclosed, that is, "A and/or B" means "(A) or (B) or (A and B)". The use of the indefinite article does not exclude a plurality. A single device can execute the functions of a plurality of units or devices mentioned in the patent claims.

Reference numerals indicated in the claims are not to be regarded as limitations on the elements and steps used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method performed by one or more devices, comprising:
   obtaining, by an optical sensor element, an intensity information item of a spectral image resulting from soiling of a textile and wherein the intensity information is dynamically determined during cleaning of the textile;
   determining an output variable from the intensity information item dependent on a chemical composition of the soiling of the textile and/or on at least one property of the textile, wherein the output variable is determined by employing an adaptive evaluation algorithm, wherein parameters of the adaptive evaluation algorithm are calibrated based on a plurality of training cases;
   outputting a treatment parameter determined in response to the output variable.

2. The method according to claim 1, wherein obtaining the intensity information item comprises the following steps:
   illuminating the soiling of the textile and/or the at least one part of textile with light comprising at least one broadband wavelength range;
   detecting an image information item of the illuminated soiling of the textile and/or the illuminated at least one part of the textile;
   determining at least a reflection information item indicative of the reflected light from the wavelength channels of the image information items corresponding to the at least one broadband wavelength;
   reconstructing the spectral image, wherein an evaluation of the at least one reflection information item takes place.

3. The method according to claim 2, wherein illuminating the soiling of the textile and/or the at least one part of textile is done with one of the following broadband wavelength ranges:
   (i) from about 600 nm to about 780 nm;
   (ii) from about 490 nm to about 600 nm;
   (iii) from about 380 nm to about 490 nm;
   (iv) or a combination thereof.

4. The method according to claim 3, wherein at least one image point within the spectral image is used as a fixed predetermined reference image point for a spectral exposure compensation of the image, wherein image data of image points of the image which are different from the at least one reference image point are normalized using image data of the at least one reference image point.

5. The method according to claim 4, the method further comprising:
   determining at least one treatment parameter of the textile based at least in part on the intensity information item; and
   outputting or triggering an outputting of the at least one treatment parameter.

6. The method according to claim 3, the method further comprising:
   determining at least one treatment parameter of the textile based at least in part on the intensity information item; and
   outputting or triggering an outputting of the at least one treatment parameter.

7. The method according to claim 3,
   wherein the adaptive evaluation algorithm is an artificial neural network;
   wherein at least one image point within the spectral image is used as a fixed predetermined reference image point for a spectral exposure compensation of the image, wherein image data of image points of the image which are different from the at least one reference image point are normalized using image data of the at least one reference image point;
   wherein the at least one part of the textile is indicative of material structure, material type, material distribution, material wear of the textile or a combination thereof;
   wherein the method further comprises determining the treatment parameter of the textile based at least in part on the intensity information item, and outputting or triggering an outputting of the at least one treatment parameter;
   wherein the at least one treatment parameter is indicative of a cleaning agent type, an amount of cleaning agent, a cleaning temperature, a type of cleaning device, settings of a cleaning device, or a combination thereof;
   wherein the method further comprises performing or causing the performance of a treatment of the textile corresponding to the at least one determined treatment parameter via at least one cleaning device;
   wherein the optical sensor element provides three-dimensional spatial resolution;
   and wherein the optical sensor element comprises at least one camera-like element and provides an image information item of the soiling of the textile and/or the at least one part of a textile.

8. The method according to claim 2, wherein at least one image point within the spectral image is used as a fixed predetermined reference image point for a spectral exposure compensation of the image, wherein image data of image points of the image which are different from the at least one reference image point are normalized using image data of the at least one reference image point.

9. The method according to claim 2, the method further comprising:
   determining at least one treatment parameter of the textile based at least in part on the intensity information item; and
   outputting or triggering an outputting of the at least one treatment parameter.

10. The method according to claim 1, wherein at least one image point within the spectral image is used as a fixed predetermined reference image point for a spectral exposure compensation of the image, wherein image data of image points of the image which are different from the at least one reference image point are normalized using image data of the at least one reference image point.

11. The method according to claim 1, wherein the at least one part of the textile is indicative of material structure, material type, material distribution, material wear of the textile or a combination thereof.

12. The method according to claim 1, the method further comprising:
   determining the treatment parameter of the textile based at least in part on the intensity information item.

13. The method according to claim 1, wherein the treatment parameter is indicative of a cleaning agent type, an amount of cleaning agent, a cleaning temperature, a type of cleaning device, settings of a cleaning device, or a combination thereof.

14. The method according to claim 1, the method further comprising:
   performing or causing the performance of a treatment of the textile corresponding to the treatment parameter via at least one treatment device.

15. The method according to claim 1, wherein the intensity information item is determined before, during and/or after a treatment of the textile.

16. The method according to claim 1, wherein the optical sensor element is a camera.

17. The method according to claim 16, wherein the optical sensor element provides three-dimensional spatial resolution.

18. The method according to claim 16, wherein the optical sensor element comprises at least one camera-like element and provides an image information item of the soiling of the textile and/or the at least one part of a textile.

19. A device which is configured as or comprises corresponding elements to perform and/or to control a method according to claim 1.

20. A computer program comprising program instructions that cause a processor to execute and/or control a method according to claim 1 when the computer program is run on the processor.

* * * * *

UNITED STATES PATENT AND TRADEMARK OFFICE
CERTIFICATE OF CORRECTION

| | | |
|---|---|---|
| PATENT NO. | : 11,773,523 B2 | |
| APPLICATION NO. | : 16/621613 | |
| DATED | : October 3, 2023 | |
| INVENTOR(S) | : Arnd Kessler et al. | |

It is certified that error appears in the above-identified patent and that said Letters Patent is hereby corrected as shown below:

In the Specification

Column 19, Line 62 change "Apple Sin" to --Apple Siri--.

Signed and Sealed this
Sixth Day of February, 2024

*Katherine Kelly Vidal*
Katherine Kelly Vidal
*Director of the United States Patent and Trademark Office*